(12) United States Patent
Ikeda

(10) Patent No.: US 8,605,318 B2
(45) Date of Patent: Dec. 10, 2013

(54) PRINT SYSTEM, RELAY APPARATUS, PRINT SERVER, AND PRINT METHOD

(75) Inventor: Motoki Ikeda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 321 days.

(21) Appl. No.: 13/192,991

(22) Filed: Jul. 28, 2011

(65) Prior Publication Data
US 2012/0050794 A1 Mar. 1, 2012

(30) Foreign Application Priority Data

Aug. 27, 2010 (JP) ................... 2010-191392

(51) Int. Cl.
*G06F 3/12* (2006.01)
*G06F 15/16* (2006.01)

(52) U.S. Cl.
USPC ........ 358/1.15; 358/1.13; 358/1.16; 709/201; 709/203; 709/212; 709/216; 709/217; 709/219; 718/102; 718/103; 718/104; 710/8; 710/14; 710/15; 710/16; 710/31

(58) Field of Classification Search
USPC .............. 358/1.1, 1.11–1.18, 400–404; 709/201–203, 211–219; 718/1, 718/100–106; 710/8, 14–18, 31, 33
See application file for complete search history.

(56) References Cited

U.S. PATENT DOCUMENTS

| | | | | |
|---|---|---|---|---|
| 6,970,263 B2 * | 11/2005 | Suzuki et al. | ................ | 358/1.15 |
| 7,215,435 B2 * | 5/2007 | Oshima | ................... | 358/1.15 |
| 7,970,817 B2 * | 6/2011 | Hagiuda et al. | ............... | 709/203 |
| 8,204,963 B2 * | 6/2012 | Shima | ........................... | 709/219 |
| 2007/0186278 A1 * | 8/2007 | Fujii et al. | ......................... | 726/5 |
| 2009/0323112 A1 * | 12/2009 | Kamei et al. | ................. | 358/1.15 |
| 2010/0171973 A1 * | 7/2010 | Kimura | ....................... | 358/1.14 |
| 2010/0235904 A1 | 9/2010 | Ikeda | | |

FOREIGN PATENT DOCUMENTS

JP 3899910 B 3/2007

* cited by examiner

*Primary Examiner* — Chad Dickerson
(74) *Attorney, Agent, or Firm* — Fitzpatrick, Cella, Harper & Scinto

(57) ABSTRACT

A relay apparatus in a print system in which a print server, the relay apparatus, and a plurality of print apparatuses are connected to a network, and which performs print processing, comprises: a search unit configured to search for a print apparatus with which the relay apparatus can communicate; a sending unit configured to send, to the print server, pieces of information of the relay apparatus and the print apparatus found by the search unit; and a relay unit configured to receive a print instruction that is issued by the print server and includes location information of document data to be printed and information of a print apparatus used to perform print processing, to download the document data based on the location information included in the print instruction, and to send both the print instruction and the downloaded document data to the print apparatus designated by the print instruction.

7 Claims, 17 Drawing Sheets

F I G. 1
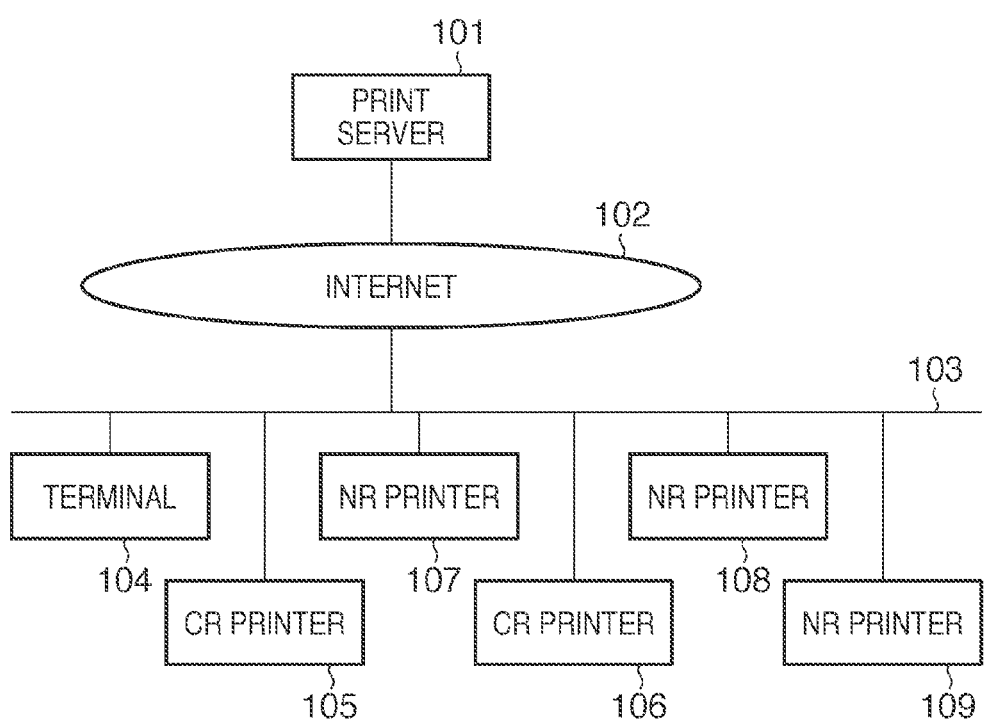

FIG. 5

```
https://www.conon.co.jp/print-service/printer_insert.do
?address=172.24.93.101&model=iR-ADV_C7065&crtype=yes
?address=172.24.93.102&model=iR-ADV_C5045F&crtype=yes
?address=172.24.93.181&model=LBP5610&crtype=no
?address=172.24.93.182&model=LBP5910&crtype=no
?address=172.24.93.183&model=LBP5610&crtype=no
```

| ID | ADDRESS | COMMENT | MODEL CODE | GLOBAL ADDRESS | USER |
|---|---|---|---|---|---|
| 1 | 172.24.93.101 | WEST-SIDE OA | iR-ADV_C0001 | 172.24.93.1 | ikeda |
| 2 | 172.24.93.102 | ENTRANCE ON SECOND FLOOR | iR-ADV_C0002 | 172.24.93.1 | ikeda |
| 3 | 172.24.93.181 | THIRD | LBP0001 | 172.24.93.1 | ikeda |
| 4 | 172.24.93.182 | SECOND | LBP0002 | 172.24.93.1 | ikeda |
| 5 | 172.24.93.183 | FIRST | LBP0001 | 172.24.93.1 | ikeda |
| 6 | 172.24.10.51 | BESIDE Mr. OR Ms. SATO | iR0001 | 172.20.10.1 | sato |
| 7 | 172.20.10.52 | BESIDE BOOKSHELF | LBP0001 | 172.20.10.1 | sato |
| 8 | 172.20.10.51 | MONOCHROME | iR0001 | 172.20.10.1 | ikeda |
| 9 | 172.20.10.52 | COLOR | LBP0001 | 172.20.10.1 | ikeda |

| NR PRINTER | CR PRINTER |
|---|---|
| 3 | 1 |
| 4 | 1 |
| 5 | 1 |
| 3 | 2 |
| 4 | 2 |
| 5 | 2 |
| 7 | 6 |

810

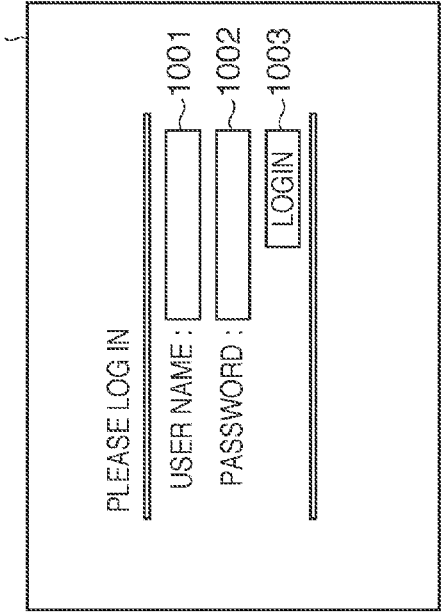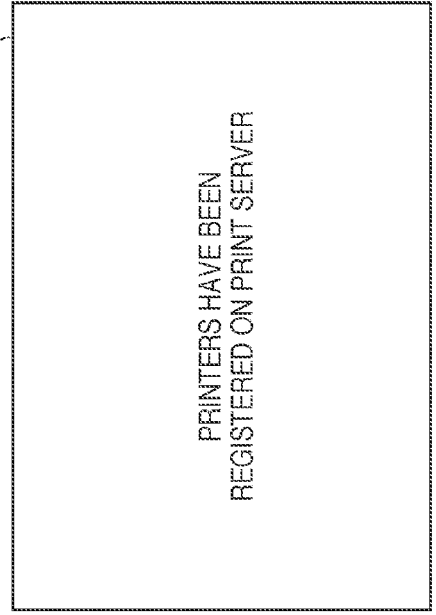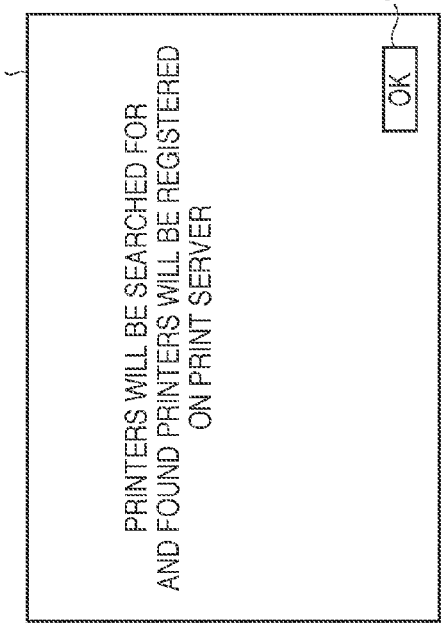

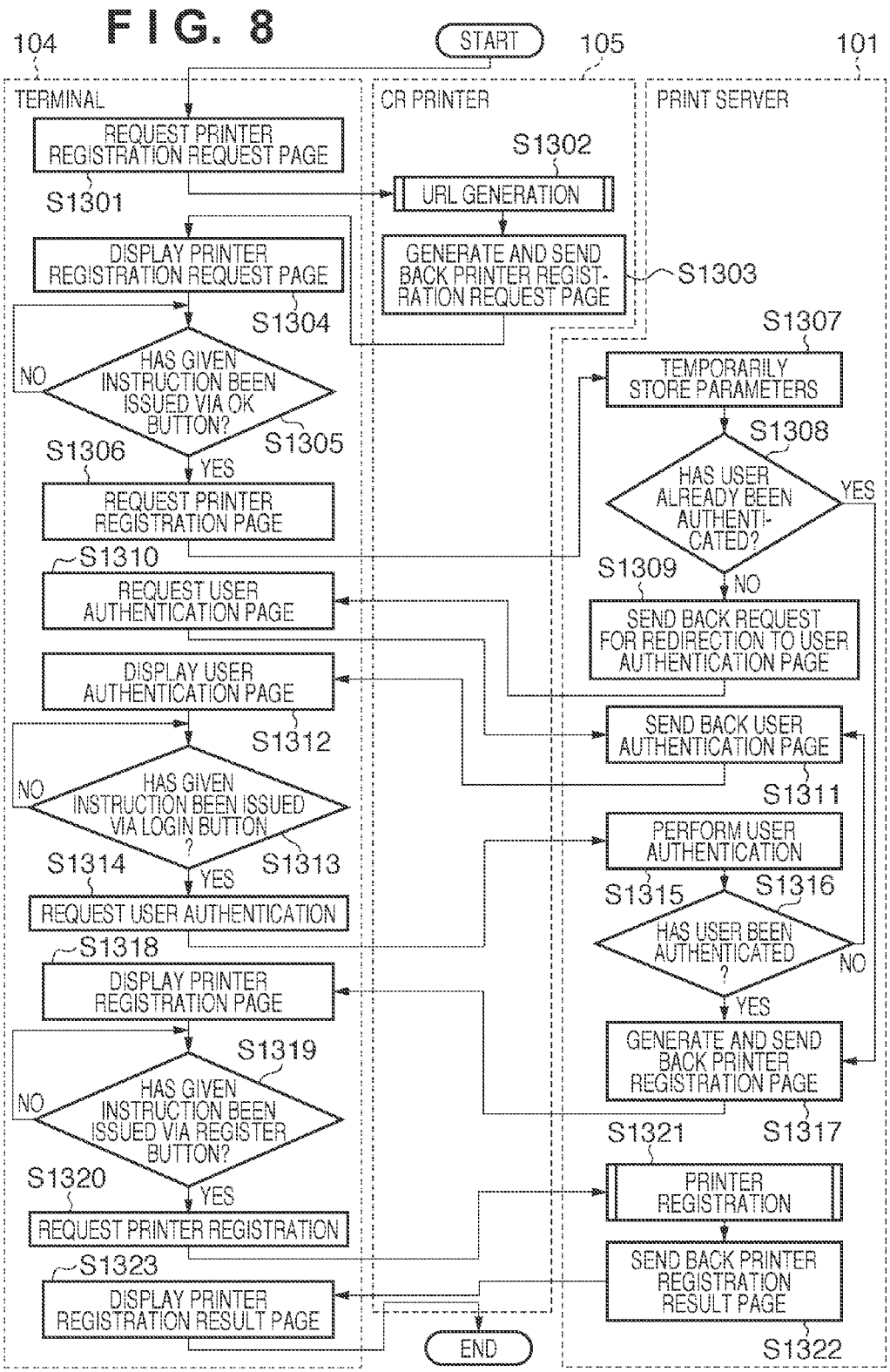

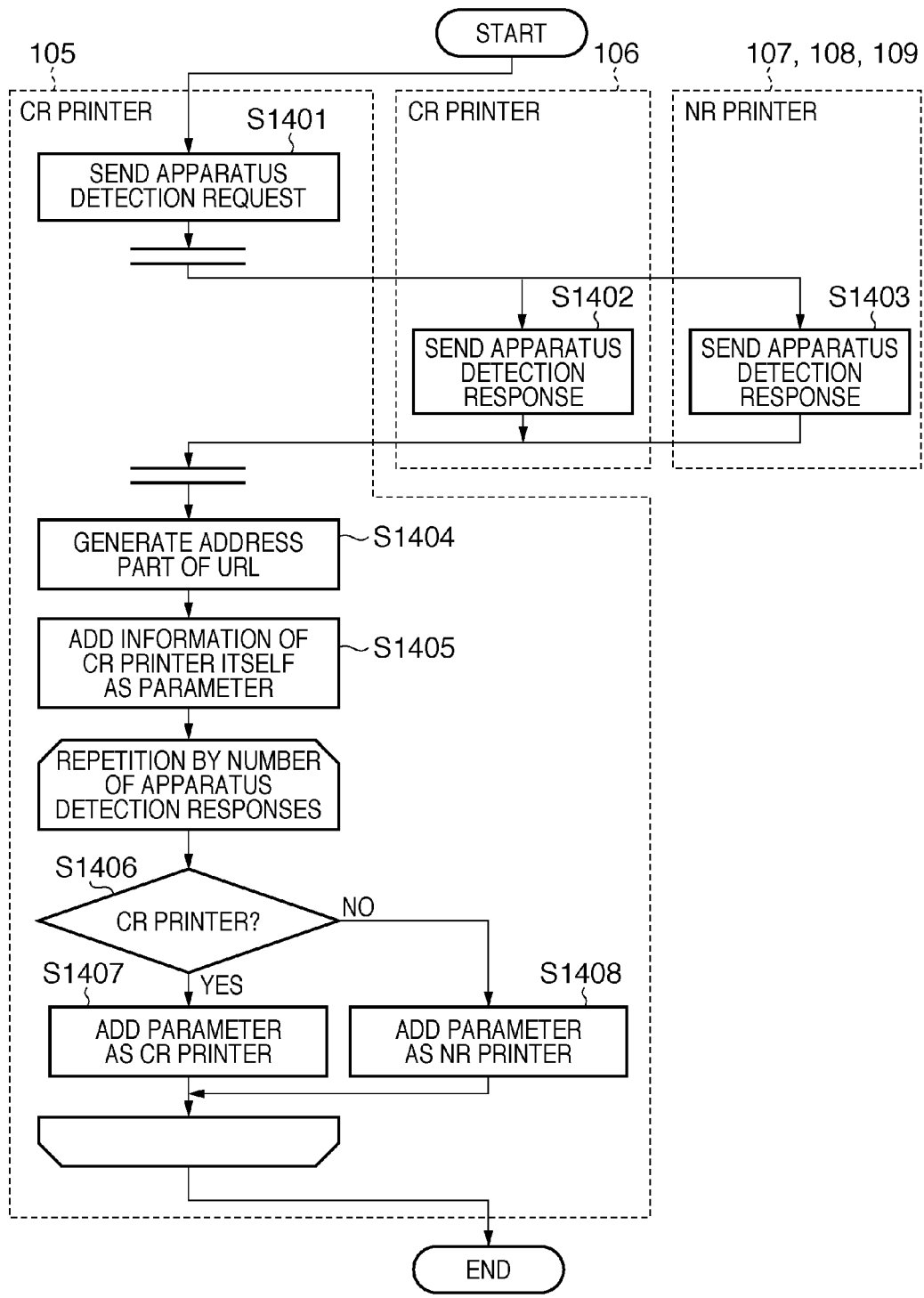

F I G. 11A

1600 https://172.24.93.101/print.do
?document=https://www.conon.co.jp/print-service/download/9xaoeha_a/aljgs

F I G. 11B

1610 https://172.24.93.101/relay.do
?document=https://www.conon.co.jp/print-service/download/9xaoeha_a/aljgs
?target=172.24.93.183

PLEASE SELECT DOCUMENT TO BE PRINTED

| | DOCUMENT NAME | TIME STAMP |
|---|---|---|
| 1701 ○ | SPECIFICATION OF PRODUCT A | 2009/12/24 12:00:10 |
| 1702 ○ | OPERATION PROCEDURE MANUAL OF PRODUCT A | 2010/03/03 17:25:55 |
| 1703 ● | OPERABILITY TEST MATERIAL_20100410 | 2010/04/10 15:35:11 |
| | | |

[PRINT] 1704

PLEASE SELECT PRINTER

| | IP ADDRESS | PRINTER TYPE | COMMENT |
|---|---|---|---|
| 1801 ○ | 172.24.93.101 | iR-ADV_C0001 | WEST-SIDE OA |
| 1802 ○ | 172.24.93.102 | iR-ADV_C0002 | ENTRANCE ON SECOND FLOOR |
| 1803 ● | 172.24.93.181 | LBP0001 | THIRD |
| 1804 ○ | 172.24.93.182 | LBP0002 | SECOND |
| 1805 ○ | 172.24.93.183 | LBP0001 | FIRST |

[GO] 1808

※ FOLLOWING PRINTERS BELONG TO DIFFERENT NETWORKS

| | | | |
|---|---|---|---|
| 1806 ○ | 172.20.10.51 | iIR0001 | MONOCHROME |
| 1807 ○ | 172.20.10.52 | LBP0001 | COLOR |

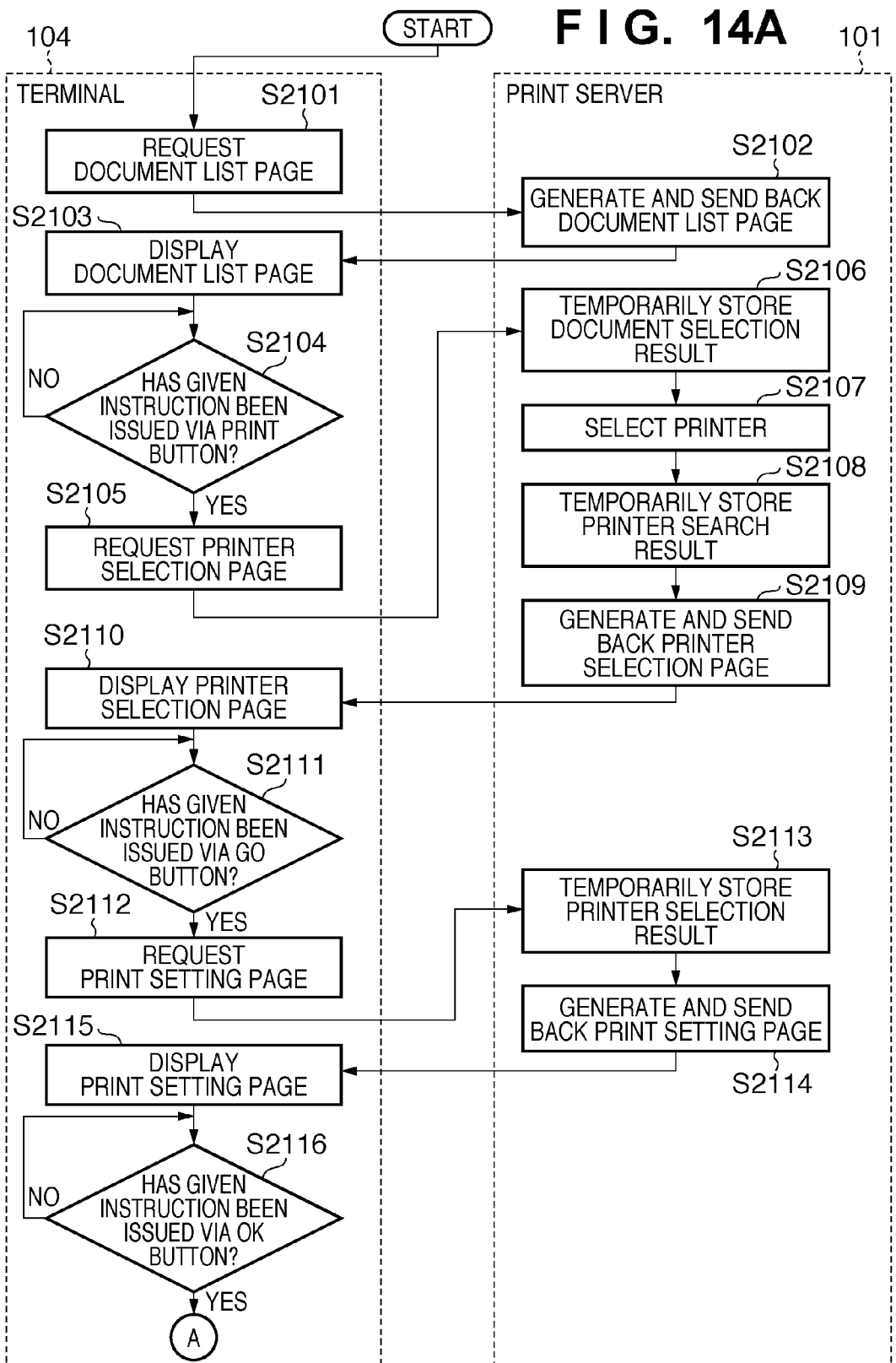

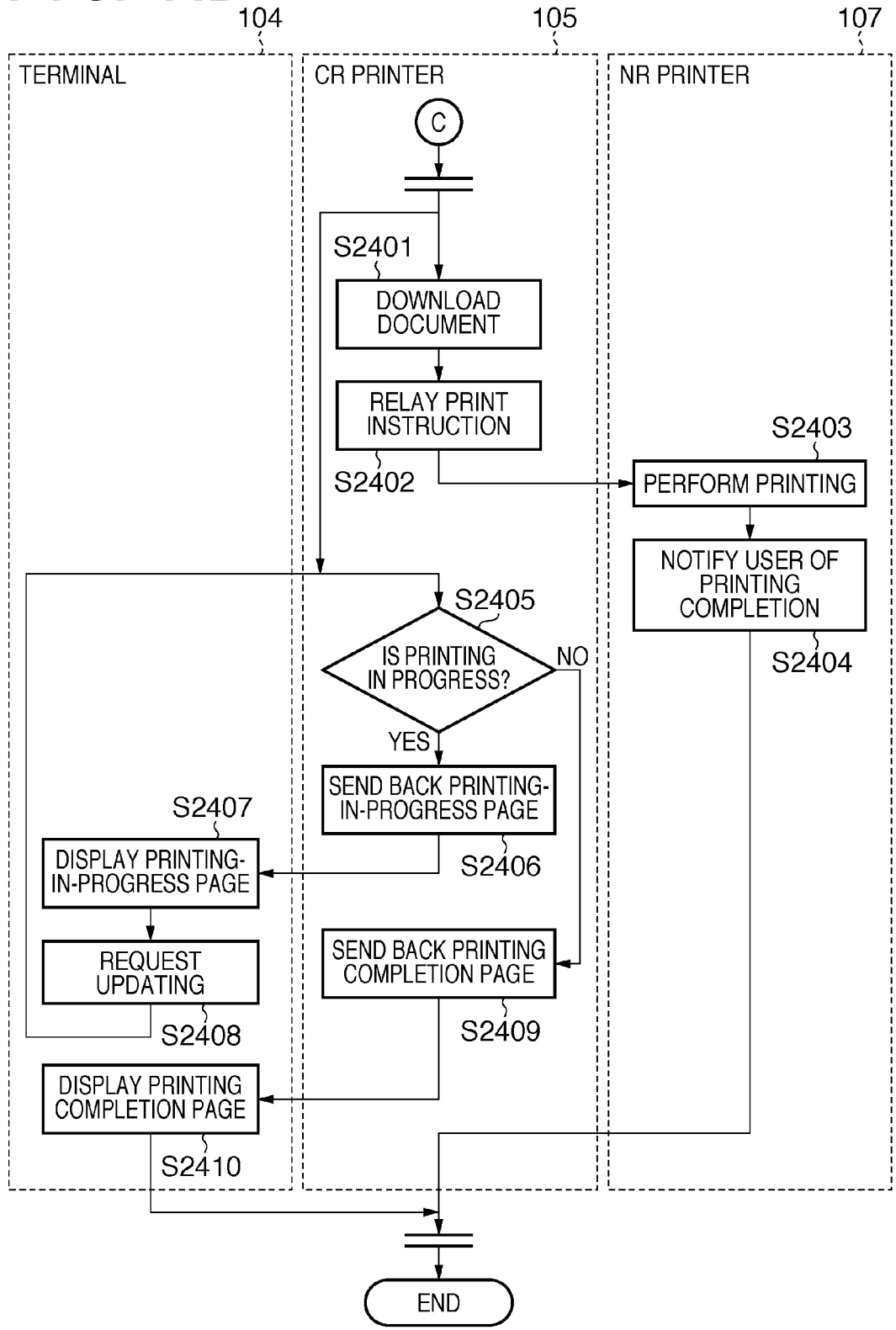

PRINT SYSTEM, RELAY APPARATUS, PRINT SERVER, AND PRINT METHOD

BACKGROUND OF THE INVENTION

1. Field of the Invention

The present invention relates to a print system, a relay apparatus, a print server, and a print method. The present invention particularly relates to a print system including a print server on the Internet and a print apparatus on a local network.

2. Description of the Related Art

With, for example, the popularization of a high-speed, high-capacity network and a reduction in cost of information infrastructures in businesses, SaaS (Software as a Service) which provides a software function on the Internet as a service is becoming prevalent. Even a print system which is conventionally built on a network in a local area such as an office is obliged to cope with SaaS as a service on the Internet. That is, it has become possible to build a print server on the Internet as SaaS, and manage a printer and a print job on a local network.

However, due, for example, to security concerns, the print server on the Internet cannot directly access the printer on the local network because of the protection provided by a firewall set between the local network and the Internet. Therefore, a print instruction is issued from the print server to the printer using, for example, the following configuration/sequence.

(1) The user displays a website provided by the print server on a web browser running on a terminal such as a PC on the local network.

(2) When the user performs an operation corresponding to a print instruction via the web browser, the instruction is sent from the web browser to the print server.

(3) The print server generates a response including the address of a managed/stored printer, an instruction for redirection to this address, and the location (URL (Uniform Resource Locator)) of document data to be printed, and sends it to the web browser.

(4) The web browser redirects the response to the address of the printer.

(5) The printer receives the redirected response. The printer then acquires the document data to be printed from that URL, and prints (pull-prints) it.

In this manner, because the print server cannot directly access the printer, it sends a print instruction including the location information of document data to be printed to the printer, and requests the printer to access it. The printer then pull-prints the document data. To achieve this feature, a printer which cooperates with the print server on the Internet needs the ability to execute pull-printing.

The following method has been proposed with regard to the conventional print system. The print server determines whether a printer has a pull-print function, and switches, in accordance with the determination result, the print instruction to be issued to the printer, between sending document data to be printed and providing notification of the location of the document data to be printed (see, for example, Japanese Patent No. 03899910).

When a print server as in the above-mentioned prior art is built as SaaS on the Internet, it cannot directly access a printer on a local network. Therefore, if the print server holds no information of each printer on the local network in advance, it cannot search the local network for this printer, and therefore can determine neither its location nor function. As a result, it is impossible to discriminate whether a print instruction which specifies the use of a pull-print function can be issued to an unregistered printer. Also, the print server on the Internet cannot issue a print instruction to a printer which does not have a function of executing pull-printing that uses SaaS on the Internet, such as a traditional printer or an inexpensive printer.

Furthermore, as is apparent from the above-mentioned example of the configuration/sequence of a print instruction, in a print system, the user must register information of a printer on a print server in advance in order to issue a print instruction from the print server to the printer. Although the above-mentioned prior art describes no method of registering a printer on the print server, the user must individually register printers present on the local network when their number is large, resulting in inconvenience for him or her.

SUMMARY OF THE INVENTION

The present invention has been made in consideration of the problem in the above-mentioned prior art, and facilitates print control and management defined between apparatuses in a print system including a print server on the Internet and a printer on a local network.

According to one aspect of the present invention, there is provided a print system in which a print server, a relay apparatus, and a plurality of print apparatuses are connected to a network, and performs print processing, wherein the relay apparatus comprises: a search unit configured to search for a print apparatus with which the relay apparatus can communicate; a sending unit configured to send, to the print server, pieces of information of the relay apparatus and the print apparatus found by the search unit; and a relay unit configured to receive a print instruction that is issued by the print server and to includes location information of document data to be printed and information of a print apparatus used to perform print processing, to download the document data based on the location information included in the print instruction, and to send both the print instruction and the downloaded document data to the print apparatus designated by the print instruction, and the print server comprises: an apparatus storage unit configured to store the information of the print apparatus sent by the sending unit of the relay apparatus; a relation storage unit configured to store association between the relay apparatus and the print apparatus, based on the pieces of information of the relay apparatus and the print apparatus, that are sent by the sending unit of the relay apparatus; a receiving unit configured to receive a print instruction issued to the print apparatus stored in the apparatus storage unit; and an instruction unit configured to issue a print instruction including the location information of the document data to be printed and the information of the print apparatus, based on the pieces of information stored in the relation storage unit and the apparatus storage unit, in response to the print instruction received by the receiving unit.

According to another aspect of the present invention, there is provided a relay apparatus in a print system in which a print server, the relay apparatus, and a plurality of print apparatuses are connected to a network, and which performs print processing, comprising: a search unit configured to search for a print apparatus with which the relay apparatus can communicate; a sending unit configured to send, to the print server, pieces of information of the relay apparatus and the print apparatus found by the search unit; and a relay unit configured to receive a print instruction that is issued by the print server and includes location information of document data to be printed and information of a print apparatus used to perform print processing, to download the document data based on the location information included in the print instruction, and to send both the print instruction and the downloaded document data to the print apparatus designated by the print instruction.

According to another aspect of the present invention, there is provided a print server in a print system in which the print server, a relay apparatus, and a plurality of print apparatuses are connected to a network, and which performs print processing, comprising: an apparatus storage unit configured to store information of the print apparatus sent by a sending unit of the relay apparatus; a relation storage unit configured to store association between the relay apparatus and the print apparatus, based on information of the relay apparatus and the information of the print apparatus, that are sent by the sending unit of the relay apparatus; a receiving unit configured to receive a print instruction issued to the print apparatus stored in the apparatus storage unit; and an instruction unit configured to issue a print instruction including location information of document data to be printed and the information of the print apparatus, based on the pieces of information stored in the relation storage unit and the apparatus storage unit, in response to the print instruction received by the receiving unit.

According to another aspect of the present invention, there is provided a print method in a print system in which a print server, a relay apparatus, and a plurality of print apparatuses are connected to a network, and which performs print processing, comprising: in the relay apparatus, a search step of searching for a print apparatus with which the relay apparatus can communicate; a sending step sending, to the print server, pieces of information of the relay apparatus and the print apparatus found in the search step; and a relay step of receiving a print instruction that is issued by the print server and includes location information of document data to be printed and information of a print apparatus used to perform print processing, downloading the document data based on the location information included in the print instruction, and sending both the print instruction and the downloaded document data to the print apparatus designated by the print instruction; and in the print server, an apparatus storage step of storing the information of the print apparatus sent in the sending step of the relay apparatus; a relation storage step of storing association between the relay apparatus and the print apparatus, based on the pieces of information of the relay apparatus and the print apparatus, that are sent in the sending step of the relay apparatus; a receiving step of receiving a print instruction issued to the print apparatus stored in the apparatus storage step; and an instruction step of issuing a print instruction including the location information of the document data to be printed and the information of the print apparatus, based on the pieces of information stored in the relation storage step and the apparatus storage step, in response to the print instruction received in the receiving step.

According to the present invention, a printer on an intranet can more easily be registered on a print server on the Internet. Also, the print server on the Internet can issue a print instruction even to a printer which does not have a pull-print function.

Further features of the present invention will become apparent from the following description of exemplary embodiments with reference to the attached drawings.

BRIEF DESCRIPTION OF THE DRAWINGS

FIG. 1 is a block diagram showing the schematic configuration of a print system;

FIG. 5 is a schematic view showing a data format;

FIGS. 6A and 6B are schematic tables showing data structures;

FIGS. 7A, 7B, 7C, and 7D are screen views illustrating screen examples;

FIG. 8 is a flowchart showing a processing procedure;

FIG. 9 is a flowchart showing a processing procedure;

FIGS. 11A and 11B are schematic views showing data formats;

FIGS. 12A and 12B are screen views illustrating screen examples;

FIGS. 14A, 14B, 14C, 14D are flowcharts showing processing procedures.

DESCRIPTION OF THE EMBODIMENTS

Figure 2A:
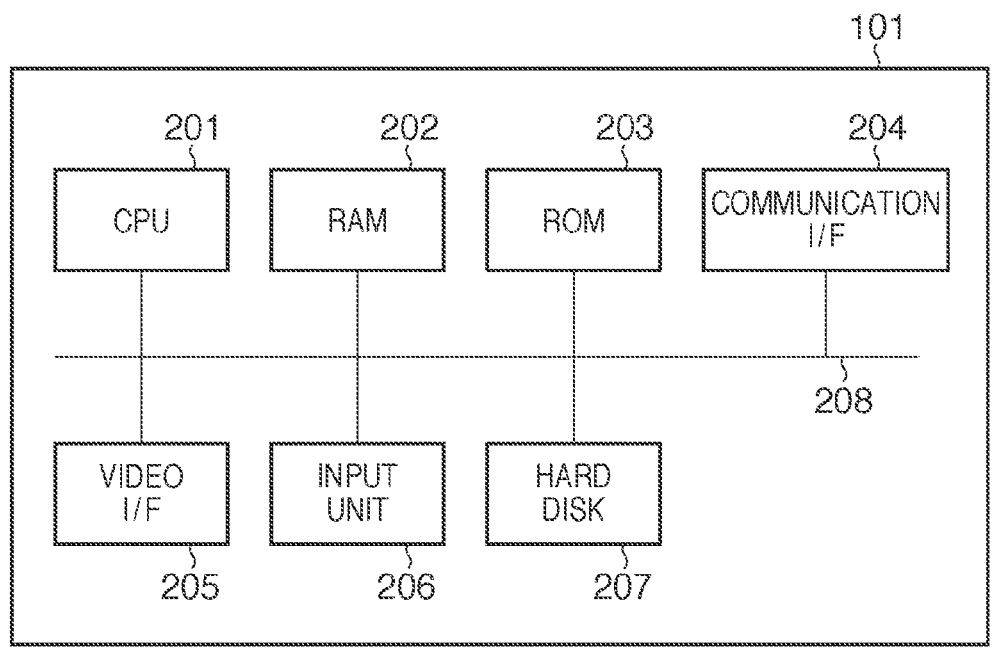
FIGS. 2A and 2B are block diagrams showing the schematic configurations of a print server and terminal.

A mode for carrying out the present invention will be described below with reference to the accompanying drawings.

<Description of Configuration>

(Print System)

FIG. 1 is a block diagram showing the configuration of a print system according to an embodiment of the present invention. A print server 101 is a service built on the Internet 102 as SaaS. The print server 101 manages a printer on a local network and a job to be executed by the printer. Also, the print server 101 issues and sends a print instruction to each printer in accordance with an instruction from, for example, the user. A local network 103 is in a predetermined area such as an office. A terminal 104 serving as an information processing apparatus such as a PC, and printers 105 to 109 are connected to the local network 103. The local network 103 and print server 101 are connected to each other via the Internet 102. A firewall (not shown) is set between the Internet 102 and the local network 103. Thus, the print server 101 located on the Internet 102 can directly access neither the terminal 104 nor printers 105 to 109 located on the local network 103.

The CR printers 105 and 106 (communication-capable print apparatuses) have a pull-print function. With this function, the CR printers 105 and 106 can directly request the print server 101 on the Internet 102 to send a document, and download and print the document in a response to this request. The NR printers 107, 108, and 109 (communication-incapable print apparatuses) which do not have such pull-print function. Therefore, these NR printers can neither directly download a document from the print server 101 on the Internet 102 nor print it. In this embodiment, a printer having a pull-print function will be collectively referred to as a "CR printer" for the sake of convenience. Also, a printer which does not have a pull-print function will be collectively referred to as an "NR printer" for the sake of convenience. Moreover, when no distinction is made between the presence/absence of a pull-print function, a CR printer and an NR printer will be collectively referred to as a "printer".

Although a system configuration which can implement this embodiment is shown in FIG. 1, the present invention is not limited to this. For example, another apparatus may be built into the local network 103, or a configuration including NR printers and CR printers larger or smaller in number than those exemplified herein may be used. Also, in this embodiment, the CR printer serves as a relay apparatus which relays a print instruction issued to the NR printer. Thus, the CR printer and the relay apparatus are identical apparatuses. However, the CR printer and the relay apparatus may be physically different apparatuses.

(Physical Configurations)

The physical configurations of the print server 101, terminal 104, CR printer 105, and NR printer 107 will be described next. Note that the CR printer 106 has the same configuration as the CR printer 105. Similarly, the NR printers 108 and 109 have the same configuration as the NR printer 107.

FIG. 2A is a block diagram showing the schematic physical configuration of the print server 101. A CPU 201, a RAM 202, a ROM 203, a communication interface 204, a video interface 205, an input unit (for example, a keyboard and a mouse) 206, and a hard disk 207 are connected to each other via a system bus 208. The CPU 201 performs hardware control and arithmetic operations based on an operating system (to be abbreviated as an OS hereinafter) and an application program (for example, a print system program in the present invention). The RAM 202 serves as a work area for the CPU 201 to store various types of data.

The ROM 203 stores, for example, a so-called BIOS which controls input/output of data to/from, for example, the hard disk 207 in cooperation with the OS. The communication interface 204 cooperates with a communication program of the OS executed by the CPU 201. The communication interface 204 communicates with an external apparatus connected via a network to exchange various types of data. The video interface 205 outputs and displays display data on a display device. The input unit 206 is used to input an instruction to the print server 101. The hard disk 207 stores, for example, the OS and the application program.

Figure 2B:
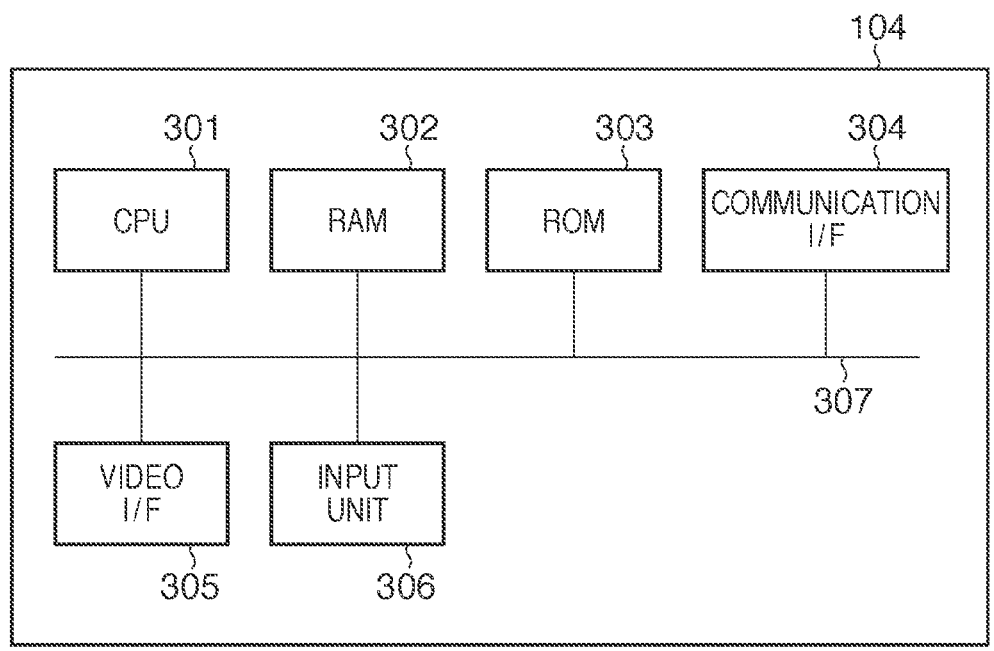

FIG. 2B is a block diagram showing the schematic physical configuration of the terminal 104 serving as an information processing apparatus. A CPU 301, a RAM 302, a ROM 303, a communication interface 304, a video interface 305, and an input unit (for example, a keyboard and a mouse) 306 are connected to each other via a system bus 307. The CPU 301 performs hardware control and arithmetic operations based on an OS program and an application program (for example, a web browser program in the present invention). The RAM 302 serves as a work area for the CPU 301 to store various types of data.

The ROM 303 stores, for example, the OS and the web browser program. The communication interface 304 cooperates with a communication program of the OS executed by the CPU 301. The communication interface 304 communicates with an external apparatus connected via a network to exchange various types of data. The video interface 305 outputs and displays display data on a display device. The input unit 306 is used to input an instruction to the terminal 104.

Figure 3A:
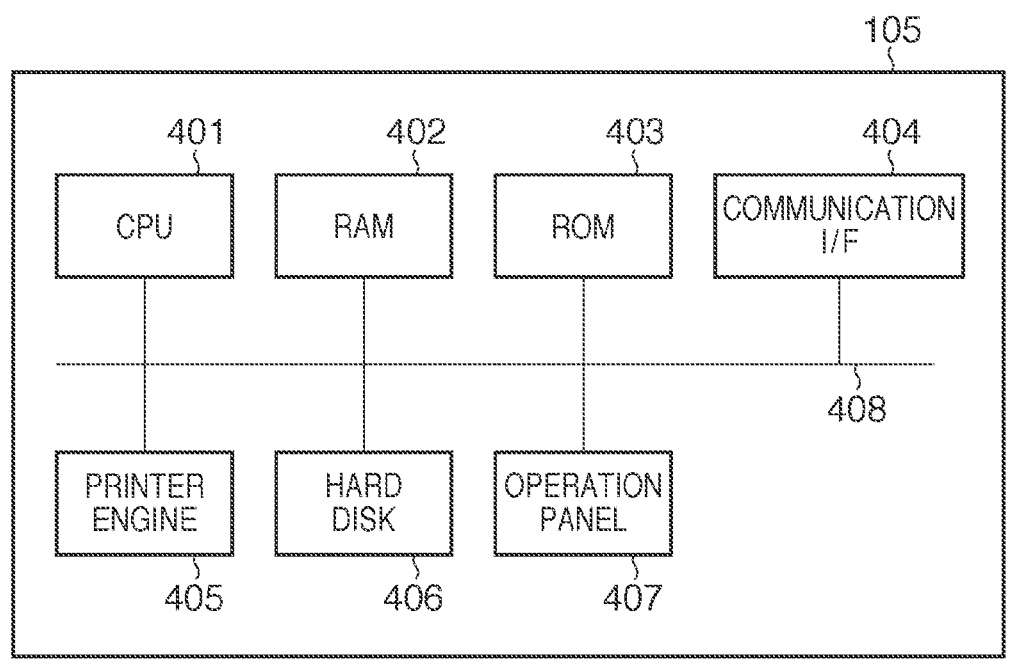
FIGS. 3A and 3B are block diagrams showing the schematic configurations of printers (capable/incapable of pull-printing)

FIG. 3A is a block diagram showing the schematic physical configuration of the CR printer 105. Note that the CR printer 106 has the same configuration as the CR printer 105. A CPU 401, a RAM 402, a ROM 403, a communication interface 404, a printer engine 405, a hard disk 406, and an operation panel 407 are connected to each other via a system bus 408. The CPU 401 performs hardware control and arithmetic operations based on a controller program (a CR printer control program in the present invention).

The RAM 402 serves as a work area for the CPU 401 to store various types of data. The ROM 403 stores, for example, a so-called BIOS which controls input/output of data to/from, for example, the hard disk 406. The communication interface 404 cooperates with the controller program executed by the CPU 401. The communication interface 404 communicates with an external apparatus connected via a network to exchange various types of data. The printer engine 405 cooperates with the controller program executed by the CPU 401.

The CPU 401 receives PDL (Page Description Language) data that is document data from an external apparatus via the communication interface 404. This PDL data is information defined to perform printing by each print apparatus. In this embodiment, this PDL data will also be referred to as document data (or simply referred to as a "document") hereinafter. Alternatively, the CPU 401 downloads PDL data from an external apparatus. The CPU 401 electrically processes the acquired PDL data to decompose it into cyan (C), magenta (M), yellow (Y), and black (Bk) components, supplies the decomposed data to the printer engine 405 as an image signal, and prints it. The hard disk 406 stores, for example, the controller program. The operation panel 407 is formed from, for example, a touch panel or a display, and can receive a user's instruction and display data.

Figure 3B:
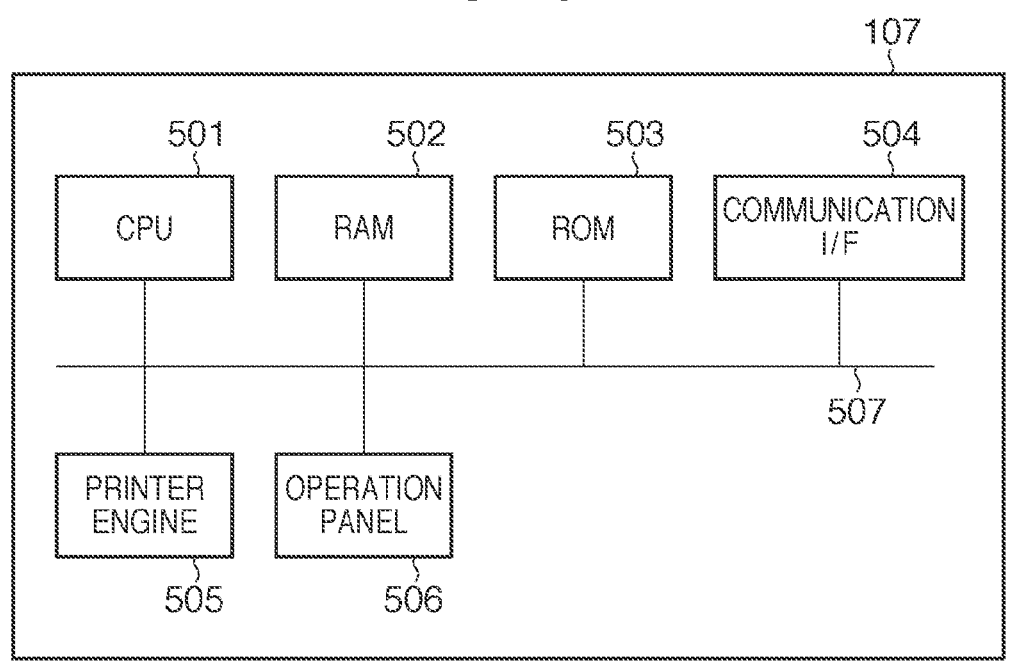

FIG. 3B is a block diagram showing the schematic physical configuration of the NR printer 107. Note that the NR printers 108 and 109 have the same configuration as the NR printer 107. A CPU 501, a RAM 502, a ROM 503, a communication interface 504, a printer engine 505, and an operation panel 506 are connected to each other via a system bus 507.

The CPU 501 performs hardware control and arithmetic operations based on a controller program (an NR printer control program in the present invention). The RAM 502 serves as a work area for the CPU 501 to store various types of data. The ROM 503 stores the controller program. The communication interface 504 cooperates with the controller program executed by the CPU 501. The communication interface 504 communicates with an external apparatus connected via a network to exchange various types of data.

The printer engine 505 cooperates with the controller program executed by the CPU 501. The CPU 501 receives PDL data from an external apparatus via the communication interface 504. The CPU 501 electrically processes the acquired PDL data to decompose it into cyan (C), magenta (M), yellow (Y), and black (Bk) components, supplies the decomposed data to the printer engine 505 as an image signal, and prints it. The operation panel 506 is formed from, for example, a touch panel or a display, and can receive a user's instruction and display data.

The NR printer 107 includes constituent elements which use hardware components less expensive than those of the CR printer 105 for a reduction in cost. That is, the CPU 501 has a throughput lower than the CPU 401. The RAM 502 has a capacity lower than the RAM 402. The NR printer 107 is equipped with no hard disk.

Although examples of physical configurations to which this embodiment is applicable have been given with reference to FIGS. 2A, 2B, 3A, and 3B, the present invention is not limited to these configurations. For example, the print server 101 and terminal 104 need only have the configurations of general information processing apparatuses. Also, the present invention is applicable to an NR printer and a CR printer as long as they have a difference in function between them, which may pose the problem to be solved by the present invention, so they may have the same physical configuration. For example, even a CR printer may be configured to receive a print instruction relayed by another CR printer when, for example, its pull-print function is temporarily unavailable.

(Logical Configurations)

Figure 4:
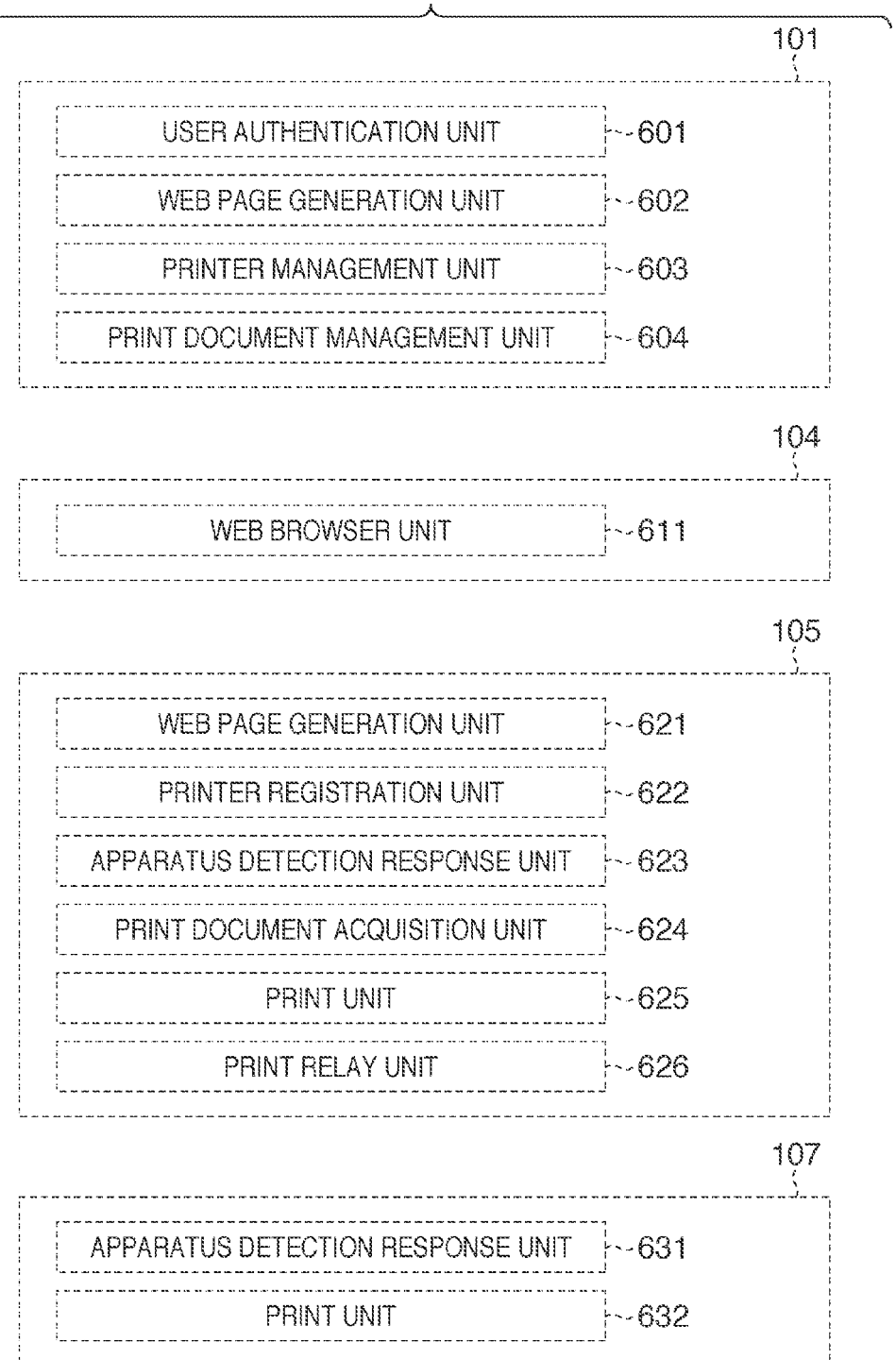
FIG. 4 is a block diagram showing schematic logical configurations.

FIG. 4 is a block diagram showing the schematic logical configurations of the print server 101, terminal 104, CR printer 105, and NR printer 107. Note that the CR printer 106 has the same configuration as the CR printer 105. Similarly, the NR printers 108 and 109 have the same configuration as the NR printer 107.

In the print server 101, the CPU 201 can store, in the RAM 202, the OS and application program stored in the hard disk 207. After storage is completed, the CPU 201 becomes ready to execute the application program.

The print server 101 includes logical constituent parts: a user authentication unit 601, a web page generation unit 602, a printer management unit 603, and a print document management unit 604. These constituent parts are implemented by executing the application program by the CPU 201. That is, these constituent parts are implemented by a combination of physical configurations: areas storing the application program in the CPU 201 and RAM 202, and those (in the RAM 202 and hard disk 207) for storing information obtained upon executing the application program by the CPU 201.

The user authentication unit 601 manages user information and performs user authentication. The web page generation unit 602 generates a web page used to send a response to the terminal 104. The printer management unit 603 stores and manages information of a printer. The print document management unit 604 manages a document to be printed by a printer, and sends back, to a CR printer, PDL data generated from the document in accordance with a request from the CR printer. That document is generated by, for example, the user using another service on the Internet 102. The other service sends the document to the print server 101. The print document management unit 604 receives that document via the communication interface 204, and stores it in the hard disk 207. At this time, the print document management unit 604 stores that document in association with the user managed by the user authentication unit 601.

In the terminal 104, the CPU 301 can store, in the RAM 302, the OS program and application program stored in the ROM 303. After program storage is completed, the CPU 301 becomes ready to execute the application program.

The terminal 104 includes a web browser unit 611 as a logical constituent part. The web browser unit 611 is implemented by executing the application program by the CPU 301. That is, the web browser unit 611 is implemented by a combination of physical configurations: areas storing the application program in the CPU 301 and RAM 302, and areas (in the RAM 302) for storing information obtained upon executing the application program by the CPU 301.

The web browser unit 611 converts a web page generated by the web page generation unit 602 of the print server 101 or by a web page generation unit 621 of the CR printer 105 (or the CR printer 106) into display data. The web browser unit 611 displays the display data on, for example, a display via the video interface 305.

In the CR printer 105, the CPU 401 can store, in the RAM 402, the controller program stored in the hard disk 406. After program storage is completed, the CPU 401 becomes ready to execute the controller program. The CR printer 105 includes logical constituent parts: the web page generation unit 621, a printer registration unit 622, an apparatus detection response unit 623, a print document acquisition unit 624, a print unit 625, and a print relay unit 626. These constituent parts are implemented by executing the controller program by the CPU 401. That is, these constituent parts are implemented by a combination of physical configurations: areas storing the application program in the CPU 401 and RAM 402, and those (in the RAM 402 and hard disk 406) for storing information obtained upon executing the application program by the CPU 401.

The web page generation unit 621 generates a web page used to send a response to the terminal 104. The printer registration unit 622 has the following function. The printer registration unit 622 searches the local network 103 for printers. The printer registration unit 622 acquires pieces of information (for example, the IP addresses and model codes) of the found printers. The printer registration unit 622 determines whether the found printers are capable of pull-printing. The determination in this embodiment indicates herein determination as to whether the found printers are CR printers or NR printers. The printer registration unit 622 sends, to the print server 101 via the communication interface 404, the pieces of information of the found printers, and the results of determination as to whether these printers are capable of pull-printing.

The apparatus detection response unit 623 receives an apparatus detection request from another device and sends a response to this request, both via the communication interface 404. The print document acquisition unit 624 downloads a document (PDL data) to be printed from the print server 101 via the communication interface 404. The print unit 625 converts the document acquired by the print document acquisition unit 624 into an image signal, outputs it to the printer engine 405, and prints it. The print relay unit 626 sends (relays) the document (PDL data) acquired by the print document acquisition unit 624 to the NR printer 107, so the NR printer 107 prints it.

In the NR printer 107, the CPU 501 can store, in the RAM 502, the controller program stored in the ROM 503. After program storage is completed, the CPU 501 becomes ready to execute the controller program. The NR printer 107 includes logical constituent parts: an apparatus detection response unit 631 and a print unit 632. These constituent parts are implemented by executing the controller program by the CPU 501. That is, these constituent parts are implemented by a combination of physical configurations: areas storing the controller program in the CPU 501 and RAM 502, and that (in the RAM 502) for storing information obtained upon executing the controller program by the CPU 501.

The apparatus detection response unit 631 receives an apparatus detection request from another device and sends a response to this request, both via the communication interface 504. The print unit 632 receives PDL data from an external apparatus via the communication interface 504. The print unit 632 converts the PDL data into an electrical signal, outputs it to the printer engine 505, and prints it.

The logical configuration of each apparatus which constitutes the print system in this embodiment has been described above with reference to FIG. 4. However, the configurations described herein merely give examples, and different physical configurations for implementing the above-mentioned functions may be provided as long as they can implement the same functions. Also, parts for implementing other functions may be provided.

<Registration of Printer on Print Server>
(Data to be Sent from CR Printer to Print Server)

FIG. 5 is a schematic view showing the format of data sent when the CR printer 105 registers printer information on the print server 101. The printer information will be described in detail below. The data mentioned herein is information (a URL 700) associated with an URL that is location information of a web page for which a request is issued to the web page generation unit 602 of the print server 101, as shown in FIG. 5. The URL 700 is assigned with data (parameter) which serves as information of each printer on the local network 103 and includes items: the IP address ("address") of this printer on the local network 103, the model code ("model") of this printer, and the information indicating whether this printer is a CR printer (this information can take a value of "yes" or "no" as "crtype"). Note that parameters equal in number to printers to be registered are assigned. The URL 700 shown in FIG. 5 gives an example in which pieces of information of five printers are assigned as parameters. FIG. 5 shows the pieces of information of the CR printer 105, CR printer 106, NR printer 107, NR printer 108, and NR printer 109 in this order from the top.

(Printer Information Managed by Print Server)

FIGS. 6A and 6B are schematic tables showing the formats of data indicating printer information managed by the printer management unit 603 of the print server 101. A printer information table 800 shown in FIG. 6A is a data table which stores printer information. One record (row) indicates one printer registered by one user (or device). The printer information table 800 implements the function of an apparatus storage unit.

An ID data item 801 is a data item for storing an identifier used to uniquely identify each record in the printer information table 800. An IP address data item 802 is a data item indicating the IP address of a given printer on a local network. A comment data item 803 is a data item indicating a character string arbitrarily input by the user. A model code data item 804 is a data item indicating information used to identify the model of the given printer. A global address data item 805 is a data item indicating the global address assigned to a local network to which the given printer belongs.

The print server 101 is a service on the Internet, and registers pieces of information of printers on a plurality of local networks. Among these printers, there are printers which belong to different local networks but nonetheless have identical IP addresses on the local networks. To distinguish between these printers, the local networks to which they belong require identification, so the global address data item 805 is managed. A user name data item 806 is data indicating the name of a user who has registered the given printer on the print server 101. The printer management unit 603 manages the individual printers for each user.

A printer relation table 810 shown in FIG. 6B is a data table which stores the association between CR printers and NR printers. One record indicates the association between one CR printer and its corresponding NR printer. To print a document by an NR printer, a CR printer which downloads and relays PDL data is set based on the association stored in the printer relation table 810. In other words, the printer relation table 810 defines information indicating a CR printer which can relay a print instruction to a predetermined NR printer upon sending the print instruction to it when the predetermined NR printer is the sending destination of the print instruction. The printer relation table 810 implements a relation storage unit.

An NR printer ID data item 811 is a data item indicating an NR printer. The NR printer ID data item 811 is linked to the ID data item 801 of the printer information table 800. A CR printer ID data item 812 is a data item indicating a CR printer. The CR printer ID data item 812 is linked to the ID data item 801 of the printer information table 800. In the printer relation table 810, three NR printers (ID=3, 4, 5) are associated with one CR printer (ID=1). These three NR printers (ID=3, 4, 5) are also associated with another CR printer (ID=2). Also, one NR printer (ID=7) is associated with still another CR printer (ID=6).

As shown in the printer relation table 810, a plurality of NR printers may be associated with a single CR printer. As a matter of course, a table which associates NR printers with CR printers in one-to-one correspondence may be formed. Further, a single NR printer may be associated with a plurality of CR printers. If a single NR printer is associated with a plurality of CR printers, a CR printer to be used with higher priority can also be determined by, for example, registering a CR printer with a higher priority level at a higher level in the table. Also, in this embodiment, the printer information table 800 and printer relation table 810 are stored in the hard disk 207 of the print server 101.

(Screen Examples)

Web pages acquired by the web browser unit 611 of the terminal 104 when printers are registered on the print server 101 will be described. The web browser unit 611 interprets these web pages to generate display data, and outputs it on, for example, a display via the video interface 305. The user can perform operations (input and instruction issuance) associated with the display contents using the input unit 306.

FIG. 7A is a screen view illustrating a display example of a web page (a printer registration request page 900) used to request printer registration. When the user issues a given instruction via an OK button 901 and has not been unauthenticated, a transition to a screen shown in FIG. 7B is made. When the user has been authenticated, a transition to a screen shown in FIG. 7C is made.

FIG. 7B is a screen view illustrating a display example of a web page (a user authentication page 1000) used to request user authentication. A user name input field 1001 displays an input user name. A password input field 1002 displays an input password. The user inputs a user name and a password, and issues a given instruction via a login button 1003. If the user authentication succeeds, a transition to a screen shown in FIG. 7C is made. If the user authentication fails, no transition to a screen is made. Alternatively, in this case, a message (not shown) indicating that the user authentication has failed may be displayed, and the data input to the screen shown in FIG. 7B may be initialized.

FIG. 7C is a screen view illustrating a display example of a web page (a printer registration page 1100) used to request printer registration. The printer registration page 1100 displays a list of printers found on the local network 103 by the CR printer 105. A printer that has already been registered on the print server 101 is displayed by hatching, so the user can perform neither a selection operation nor a comment input operation for this printer. For example, the fourth record from the top corresponds to an already registered printer (printer model: LBP0002).

Check boxes 1101 to 1104 display information as to whether those printers are to be registered on the print server 101. In this case, comment input fields 1105 to 1108 display the contents of comments input for those printers. A "comment" indicates a character string arbitrarily input by the user. When the user issues a given instruction via a register button 1109, a transition to a screen shown in FIG. 7D is made.

FIG. 7D is a screen view illustrating a display example of a web page (a printer registration result page 1200) used to notify the user of a completed printer registration. The printer registration result page 1200 displays information indicating that printers have been registered.

(Printer Registration Processing)

Processing when printers are registered on the print server 101 will be described. FIG. 8 is a flowchart showing the sequence of printer information registration processing executed by the print server 101, the terminal 104, and the CR printer 105 in cooperation with each other. The processing mentioned herein is performed by, for example, using the CPU of each apparatus during processing to read out and execute a program stored in each storage unit. Similarly, various types of data processed during processing are stored in a temporary storage unit (for example, the RAM) of that apparatus, and read out as needed.

First, the web browser unit 611 of the terminal 104 having received a user's instruction requests the CR printer 105 to send a printer registration request page 900 (S1301). When the CR printer 105 receives the above-mentioned request from the terminal 104, it uses the printer registration unit 622 to search the local network 103 for other printers. The printer registration unit 622 collects pieces of information to be registered on the print server 101. Based on the pieces of information collected by the printer registration unit 622, the web page generation unit 621 generates a URL 700 as shown in FIG. 5 (S1302). The URL generation processing in step S1302 will be described later with reference to FIG. 9.

The web page generation unit 621 generates the printer registration request page 900, and sends it back to the terminal 104 as a response (S1303). The URL 700 is stored in the printer registration request page 900 as data within a web page. The web browser unit 611 of the terminal 104 displays the printer registration request page 900 sent back from the CR printer 105 in step S1303 (S1304). When the user issues a given instruction via the OK button 901 (S1305), the web browser unit 611 requests the print server 101 to send the web page designated by the URL 700 stored in the printer registration request page 900 (S1306). The web page in this case corresponds to a printer registration page 1100.

The web page generation unit 602 of the print server 101 receives the above-mentioned request from the terminal 104. The web page generation unit 602 temporarily stores parameters included in the URL 700 (S1307). The web page generation unit 602 determines whether the user has already been authenticated (S1308). If the user has already been authenticated (YES in step S1308), the authenticated user name has already been stored, and is therefore confirmed, and the process advances to step S1317. If the user has not yet been authenticated (NO in step S1308), the process advances to step S1309. In this case, the user has issued the first request to the web page generation unit 602, so it is determined that he or she has not yet been authenticated.

The web page generation unit 602 sends back a request for redirection to a user authentication page 1000 to the terminal 104 as a response (S1309). Upon receiving the above-mentioned request for redirection from the print server 101, the web browser unit 611 of the terminal 104 requests the print server 101 to send a user authentication page 1000 at the redirection destination (S1310). Upon receiving the above-mentioned request from the terminal 104, the web page generation unit 602 of the print server 101 sends back the user authentication page 1000 to the terminal 104 (S1311).

The web browser unit 611 of the terminal 104 displays the user authentication page 1000 sent back from the print server 101 in step S1311 (S1312). If the user issues a given instruction via the login button 1003 (YES in step S1313), the web browser unit 611 sends the user name and password input by the user to the print server 101 to request user authentication (S1314). Upon receiving the above-mentioned request from the terminal 104, the web page generation unit 602 of the print server 101 transfers the received user name and password to the user authentication unit 601. The user authentication unit 601 performs user authentication (S1315).

The user authentication unit 601 performs authentication by determining whether a user which matches the user name and password has been registered in a user information table (not shown) stored within itself. If the authentication succeeds (YES in step S1316), the user authentication unit 601 transfers the user name to the web page generation unit 602, and the web page generation unit 602 temporarily stores it.

The web page generation unit 602 generates data of the printer registration page 1100, and sends it back to the terminal 104 as a response (S1317). The printer registration page 1100 is generated based on the parameters temporarily stored in step S1307. If the authentication fails in step S1316 (NO in step S1316), the process returns to step S1311.

The web browser unit 611 of the terminal 104 displays the printer registration page 1100 sent back from the print server 101 in step S1317 (S1318). If the user issues a given instruction via the register button 1109 (YES in step S1319), the web browser unit 611 sends a printer selection result and comment input by the user to the print server 101 to request printer registration (S1320).

Upon receiving the above-mentioned request from the terminal 104, the web page generation unit 602 of the print server 101 transfers the following information to the printer management unit 603. The information transferred at this time includes the parameters temporarily stored in step S1307, the received printer selection result and comment, and the temporarily stored user name. The printer management unit 603 performs printer registration processing (S1321). The printer registration processing in step S1321 will be described later with reference to FIG. 10.

When the printer management unit 603 completes the printer registration processing, the web page generation unit 602 sends back a printer registration result page 1200 to the terminal 104 as a response (S1322). The web browser unit 611 of the terminal 104 displays the printer registration result page 1200 sent back from the print server 101 in step S1322 (S1323).

(URL Generation Processing by CR Printer)

As shown in step S1302 of FIG. 8, the printer registration unit 622 of the CR printer 105 searches the local network 103 for other printers to collect pieces of information to be registered on the print server 101. The printer registration unit 622 generates a URL 700. This processing will be explained. Note that in this embodiment, "generation of a URL" indicates generation of data corresponding to the URL 700 shown in FIG. 5.

Also, the processing mentioned herein is performed by, for example, using the CPU of a CR printer during processing to read out and execute a program stored in each storage unit. Similarly, various types of data processed during processing are stored in a temporary storage unit (for example, the RAM) of the CR printer, and read out as needed.

FIG. 9 is a flowchart showing the sequence of processing in which the CR printer 105 searches the local network 103 for other printers, and generates a URL 700. A CR printer and an NR printer have WS-Discovery (Web Service Dynamic Discovery) installed on them. Although WS-Discovery is used as a scheme of searching for the connection state between the individual printers in this embodiment, another scheme (for example, a protocol) may be used.

The printer registration unit 622 of the CR printer 105 sends an apparatus detection request (Probe message) based on WS-Discovery to the local network 103 by multicasting (S1401). The apparatus detection response unit 623 of the CR printer 106 receives the apparatus detection request from the CR printer 105 via the communication interface 404. The apparatus detection response units 631 of the NR printers 107, 108, and 109 also receive the apparatus detection request from the CR printer 105 via the communication interfaces 504. The CR printer 106 and NR printers 107, 108, and 109 send apparatus detection responses (ProbeMatch messages) to the CR printer 105 by unicasting (S1402 & S1403). At this time, the CR printer 106 includes, in the apparatus detection response, information indicating a print service and a pull-print service as the types of compliant service. Also, each of the NR printers 107, 108, and 109 includes, in the apparatus detection response, information indicating a print service as the type of compliant service. Note that in the flowchart shown in this specification, processing operations inserted between objects "=" are executed in parallel or in series, and the process advances to subsequent steps after all these processing operations are completed. For example, referring to FIG. 9, step S1402 or S1403 inserted between objects "=" is executed, and then the process advances to step S1404, in either case.

Upon receiving the apparatus detection response from each printer, the printer registration unit 622 of the CR printer 105 generates an address part indicating the printer registration result page 1200 in the URL 700 (S1404). For example, this address part corresponds to "https://www.canon.co.jp/print-service/forwardprinterinsert.do" among the pieces of information included in the URL 700 shown in FIG. 5.

The printer registration unit 622 adds information of the CR printer 105 to the URL 700 as a parameter (S1405). An IP address to be stored in "address", and a model code to be stored in "model" are stored in advance in the ROM 403 or hard disk 406 serving as a storage unit. The printer registration unit 622 sets "yes" as "crtype". The printer registration unit 622 repeats steps S1406 to S1408 by a number of times equal to the number of received apparatus detection responses.

The printer registration unit 622 of the CR printer 105 determines whether the apparatus having sent the apparatus detection response is a CR printer or an NR printer (S1406). The printer registration unit 622 refers to an information part indicating the type of compliant service for the received apparatus detection response to determine that the apparatus having sent this response is a CR printer if this information part includes a pull-print service; or determine that the apparatus having sent this response is an NR printer if this information part includes no pull-print service. If the apparatus having sent the apparatus detection response is a CR printer (YES in step S1406), the process advances to step S1407. If the apparatus having sent the apparatus detection response is an NR printer (NO in step S1406), the process advances to step S1408.

In step S1407, the printer registration unit 622 of the CR printer 105 adds a parameter to the URL 700 upon setting "yes" as "crtype". In step S1408, the printer registration unit 622 of the CR printer 105 adds a parameter to the URL 700 upon setting "no" as "crtype". In steps S1407 and S1408, an IP address to be stored in "address" and a model code to be stored in "model" are included in the apparatus detection response, and the printer registration unit 622 includes them in the parameter. In the above-mentioned way, the sequence of the URL generation processing ends.

(Printer Registration Processing by Print Server)

Figure 10:
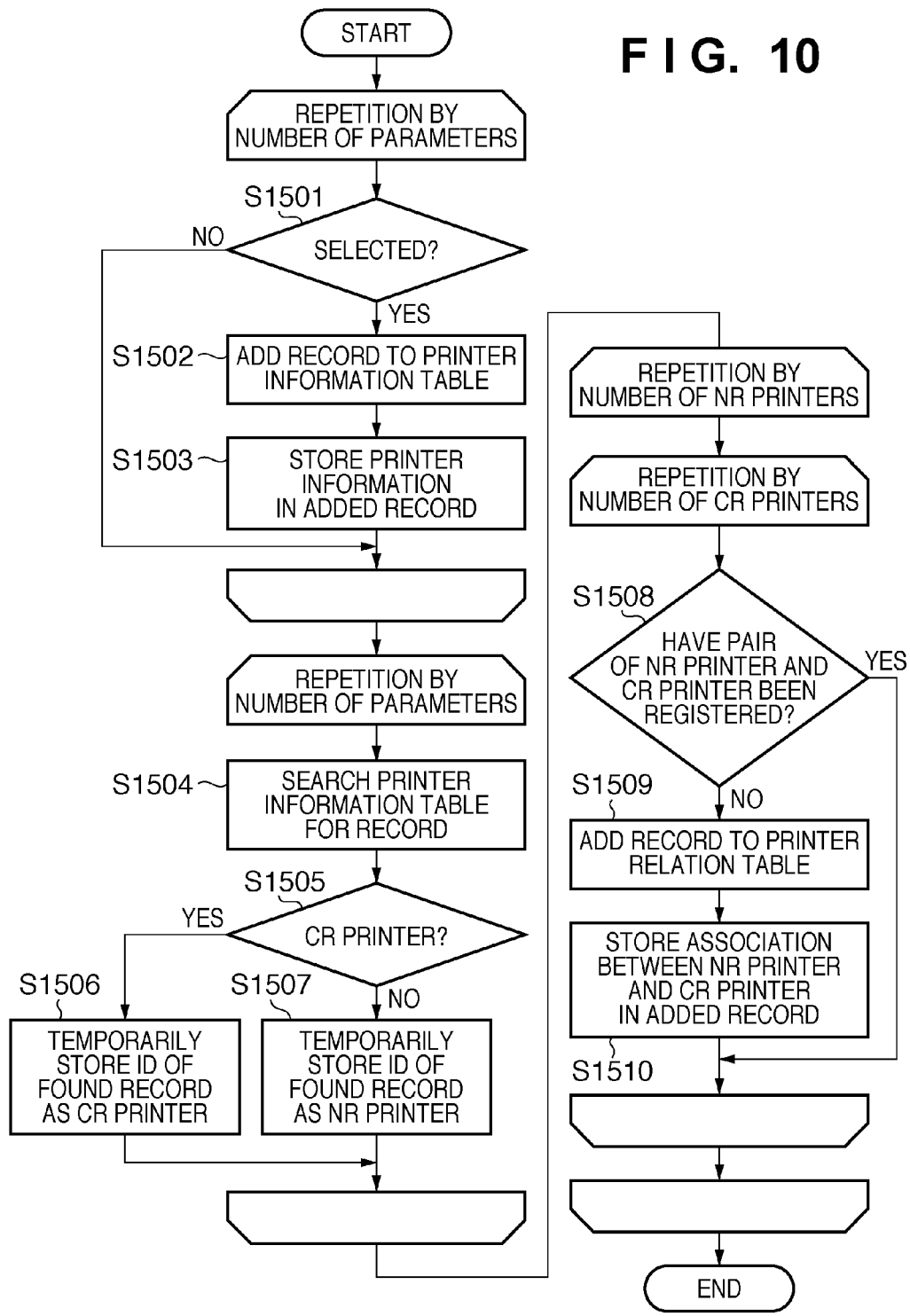
FIG. 10 is a flowchart showing a processing procedure.

As shown in step S1321 of FIG. 8, the printer management unit 603 of the print server 101 performs printer registration processing based on the information received from the CR printer 105. This processing will be explained. FIG. 10 is a flowchart showing the sequence of processing in which the print server 101 registers printers. The processing mentioned herein is performed by, for example, using the CPU of the print server to read out and execute a program stored in each storage unit. Similarly, various types of data processed during processing are stored in a temporary storage unit (for example, the RAM) of the print server, and read out as needed.

The printer management unit 603 of the print server 101 receives the following information from the web page generation unit 602, and starts the process. The information includes herein (1) parameters added to the URL 700, (2) printer selection result and (3) comment, which are received from the terminal 104 in step S1321 of FIG. 8, (4) global address of the local network 103, which is acquired from a TCP/IP packet received during communication with the terminal 104, and (5) user name of the currently authenticated user.

The printer management unit 603 repeats steps S1501 to S1503 by a number of times equal to the number of parameters (1). The printer management unit 603 determines whether a printer corresponding to the currently processed parameter is selected in the printer selection result (2) (S1501). If this printer is selected (YES in step S1501), the process advances to step S1502. If this printer is not selected (NO in step S1501), the processing for the currently processed parameter ends. The printer management unit 603 adds a record to the printer information table 800 (S1502).

The printer management unit 603 stores, in the record added in step S1502, information of a printer to be registered (S1503). In this embodiment, the following items are stored. A value obtained by incrementing by one that of the ID data item of the immediately preceding record is stored for the ID data item 801. In other words, an ID with a minimum number among unused ID numbers is added and registered. The value of parameter "address" is stored for the IP address data item 802. Comment (3) is stored for the comment data item 803. The value of parameter "model" is stored for the model code data item 804. Global address (4) is stored for the global address data item 805. User name (5) of the currently authenticated user is stored for the user name data item 806.

The printer management unit 603 repeats steps S1504 to S1507 by a number of times equal to the number of parameters. The printer management unit 603 searches the printer information table 800 for a record corresponding to the currently processed parameter (S1504). In this processing, records having values which coincide with those of the following items are detected. When the value of the IP address data item 802 coincides with that of the parameter "address", the value of the global address data item 805 coincides with that of the global address (4), and the value of the user name data item 806 coincides with that of the user name (5), they are detected as search results.

The printer management unit 603 determines whether a printer corresponding to the currently processed parameter is a CR printer (S1505). This is done by determining whether parameter "type" is "yes". If this printer is a CR printer (YES in step S1505), the process advances to step S1506. If this printer is not a CR printer (that is, this printer is an NR printer) (NO in step S1505), the process advances to step S1507.

The printer management unit 603 temporarily stores, as an ID group of CR printers, the IDs (the values of the ID data item 801) of the records found in step S1504 (S1506). After repetitive processing corresponding to the number of parameters is completed, a list of IDs of CR printers which correspond to parameters (1) and have been registered on the print server 101 is stored.

The printer management unit 603 stores, as an ID group of NR printers, the IDs (the values of the ID data item 801) of the records found in step S1504 (S1507). After repetitive processing corresponding to the number of parameters is completed, a list of IDs of NR printers which correspond to parameters (1) and have been registered on the print server 101 is stored.

The printer management unit 603 repeats steps S1508 to S1510 by a number of times equal to the number of IDs of NR printers acquired in step S1507 and by a number of times equal to the number of IDs of CR printers acquired in step S1506. The printer management unit 603 determines whether a record formed from a pair of IDs of the currently processed NR printer and its corresponding CR printer has been registered in the printer relation table 810 (S1508). In this processing, records having values which coincide with those of the following items are detected. When the value of the NR printer ID data item 811 coincides with that of the ID of the currently processed NR printer, and the value of the CR printer ID data item 812 coincides with that of the ID of the currently processed CR printer, they are detected as search results. If that record is determined, based on the detection results, to have been registered (YES in step S1508), the processing for the ID of the currently processed CR printer ends. If that record is not determined to have been registered (NO in step S1508), the process advances to step S1509.

In step S1509, the printer management unit 603 adds a record to the printer relation table 810. The printer management unit 603 stores, in the record added in step S1509, information of a printer to be registered (S1510). At this time as well, the following data is stored. The ID of the currently processed NR printer is stored for the NR printer ID data item 811. The ID of the currently processed CR printer is stored for the CR printer ID data item 812.

In the above-mentioned way, the sequence of the printer registration processing ends.

<Print Processing>

(Data Formats)

FIGS. 11A and 11B are schematic views showing examples of the formats of data generated by the print server 101 and sent to a CR printer by the terminal 104 to issue a print instruction. As shown in FIGS. 11A and 11B, those data are the URLs (URLs 1600 and 1610) of web pages for which a request is issued to the web page generation unit 621 of the CR printer.

The URL 1600 shown in FIG. 11A is used to issue a print instruction to a CR printer. The URL 1600 includes, as a parameter, the location ("document") of PDL data to be printed. The CR printer downloads the PDL data by referring to its location information, and prints it.

The URL 1610 shown in FIG. 11B is used to instruct a CR printer to relay a print instruction. In other words, the URL 1610 is used to issue a print instruction to an NR printer. The URL 1610 includes, as a parameter, the location ("document") of a document to be printed, like the URL 1600. The URL 1610 also includes, as a parameter, the designation ("target") of an NR printer which serves as the relay destination and receives a print instruction. The value of "target" is the IP address of the NR printer. The CR printer downloads PDL data specified in "document", and sends it to the NR printer specified in "target" to allow the NR printer to print it.

(Description of Screen Examples)

Web pages acquired by the web browser unit 611 of the terminal 104 when the user prints them will be described. The web browser unit 611 interprets these web pages to generate display data, and outputs it on, for example, a display via the video interface 305. The user can perform operations (input and instruction issuance) associated with the display contents using the input unit 306. Upon receiving the operations by the user, the terminal 104 performs various types of processing. The print server 101 issues a web page to the terminal 104, and receives an instruction input via the web page, thereby implementing a receiving unit.

FIG. 12A is a screen view illustrating a display example of a page (a document list page 1700) used to designate a document to be printed. The document list page 1700 displays a list of documents stored in the print server 101 in association with the names of the currently authenticated users. Radio buttons 1701 to 1703 display selection of a document to be printed, based on the user input result. When the user issues a given instruction via a print button 1704, a transition to a screen shown in FIG. 12B is made.

FIG. 12B is a screen view illustrating a display example of a page (a printer list page 1800) used to select a printer where the document is to be printed. The printer list page 1800 displays a list of documents stored in the print server 101 in association with the names of the currently authenticated users. Although the printer list page 1800 separately displays printers on the same network as in the terminal 104 and those on networks different from the terminal 104, a printer on a different network can also be selected. Radio buttons 1801 to 1807 display selection of a document to be printed, based on the user input result. When the user issues a given instruction via a go button 1808, a transition to a screen shown in FIG. 13A is made.

Figure 13A:
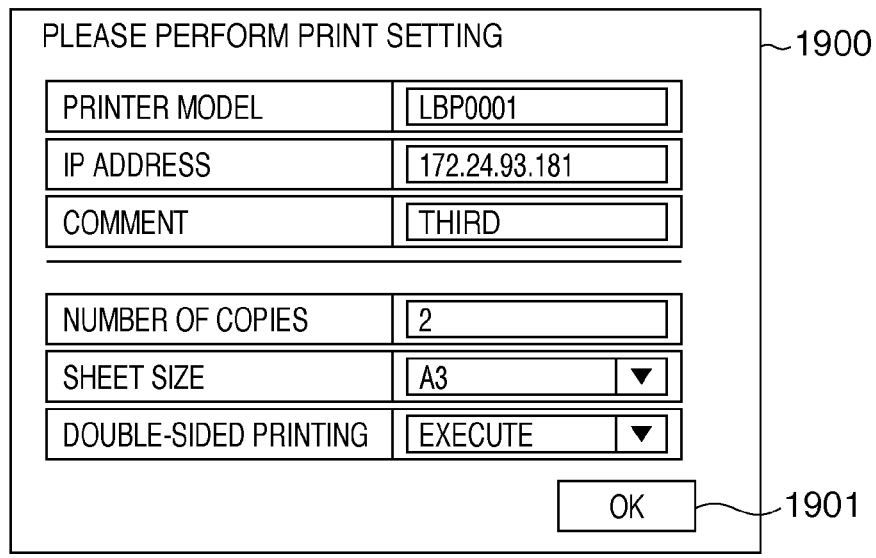
FIGS. 13A, 13B, and 13C are screen views illustrating screen examples.

FIG. 13A is a screen view illustrating a display example of a page (a print setting page 1900) used to perform print setting. The print setting page 1900 displays setting items such as the number of copies, the sheet size, and the execution/non-execution of double-sided printing, in accordance with the functions of the printer selected in the printer list page 1800. When the user issues a given instruction via an OK button 1901, printing is requested, and a transition to a screen shown in FIG. 13B is made.

Figure 13B:
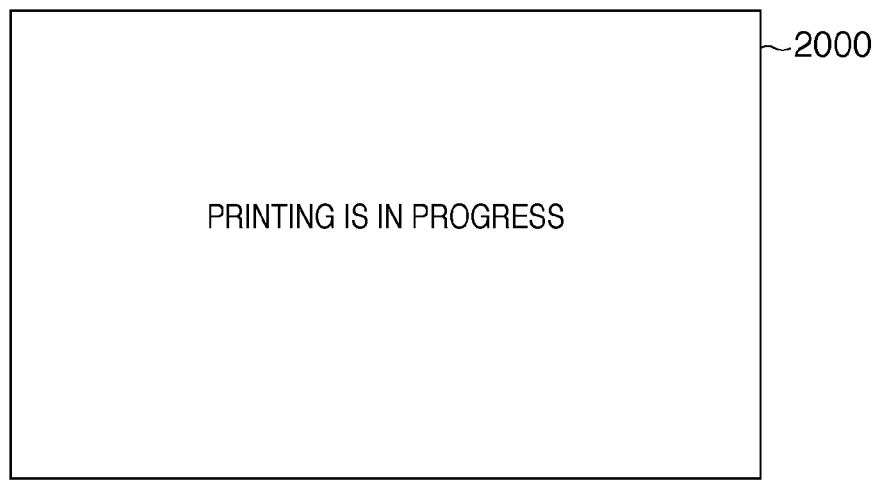
Figure 13C:

FIG. 13B is a screen view illustrating a display example of a page (a printing-in-progress page 2000) indicating that printing is in progress. FIG. 13C is a screen view illustrating a display example of a printing completion page (printing completion page 2010). When printing requested by the given instruction issued via the OK button 1901 by the user is incomplete, the printing-in-progress page 2000 shown in FIG. 13B is displayed. After that, when the print processing is complete, the printing completion page 2010 shown in FIG. 13C is displayed.

(Description of Print Processing)

Processing when a CR printer or an NR printer managed by the print server 101 prints a document will be described. FIGS. 14A to 14D are flowcharts showing the sequence of print processing executed by the print server 101, the terminal 104, the CR printer 105, and the NR printer 107 in cooperation with each other. The processing mentioned herein is performed by, for example, using the CPU of each apparatus during processing to read out and execute a program stored in each storage unit. Similarly, various types of data processed during processing are stored in a temporary storage unit (for example, the RAM) of that apparatus, and read out as needed.

Processing until a print request is issued will be described with reference to FIG. 14A. The web browser unit 611 of the terminal 104 having received a user's instruction requests the print server 101 to send a document list page 1700 (S2101). In this case, the user authentication unit 601 of the print server 101 has already been authenticated. The web page generation unit 602 of the print server 101 temporarily stores the user name. Note that an authentication method as has been described with reference to FIGS. 7A, 7B, 7C, and 7D is also used in this case.

Upon receiving the above-mentioned request from the terminal 104, the web page generation unit 602 of the print server 101 generates the document list page 1700, and sends it back to the terminal 104 as a response (S2102). At this time, the web page generation unit 602 of the print server 101 transfers the user temporarily stored in it to the print document management unit 604. The print document management unit 604 of the print server 101 generates information of a list of documents stored in association with the transferred user name, and sends it back to the web page generation unit 602. The web page generation unit 602 generates the document list page 1700 based on the information of a list of documents transferred from the print document management unit 604.

The web browser unit 611 of the terminal 104 displays the document list page 1700 sent back from the print server 101 in step S2102 (S2103). When the user issues a given instruction via the print button 1704 (S2104), the web browser unit 611 of the terminal 104 sends a document selection result input by the user to the print server 101 to request a printer selection page (S2105).

Upon receiving the above-mentioned request from the terminal 104, the web page generation unit 602 of the print server 101 temporarily stores the received document selection result (S2106). The web page generation unit 602 of the print server 101 transfers the following information to the printer management unit 603 to acquire information of a list of printers to which a print instruction can be issued (S2107). The transferred information includes herein (1) user name of the temporarily stored, currently authenticated user, and (2) global address of the local network 103, which is acquired from a TCP/IP packet received during communication with the terminal 104. The printer management unit 603 of the print server 101 searches the printer information table 800 for all records in which the global address data item 805 and global address (2) coincide with each other, and the user name data item 806 and user name (1) coincide with each other. The printer management unit 603 transfers these records to the web page generation unit 602 of the print server 101.

The web page generation unit 602 of the print server 101 temporarily stores the information of a list of printers to which a print instruction can be issued, which is acquired in step S2107 (S2108). The web page generation unit 602 generates a printer list page 1800 based on the printer information acquired in step S2107, and sends it back to the terminal 104 as a response (S2109).

The web browser unit 611 of the terminal 104 displays the printer list page 1800 sent back from the print server 101 in step S2109 (S2110). When the user issues a given instruction via the go button 1808 in the printer list page 1800 (YES in step S2111), the web browser unit 611 of the terminal 104 sends a printer selection result input by the user to the print server 101 to request a print setting page (S2112).

Upon receiving the above-mentioned request from the terminal 104, the web page generation unit 602 of the print server 101 temporarily stores the received printer selection result (S2113). The web page generation unit 602 generates a print setting page 1900, and sends it back to the terminal 104 as a response (S2114). The web page generation unit 602 of the print server 101 acquires the model code (the value of the model code data item 804) of the selected printer from the printer selection result received in step S2113, and the information of a list of printers to which a print instruction can be issued, which is stored in step S2108. The web page generation unit 602 determines print setting items in accordance with this value, and generates the print setting page 1900 in accordance with the determination result.

The web browser unit 611 of the terminal 104 displays the print setting page 1900 sent back from the print server 101 in step S2114 (S2115). When the user issues a given instruction via the OK button 1901 in the displayed print setting page 1900 (YES in step S2116), the process advances to a processing procedure shown in FIG. 14B.

Processing until the print server 101 issues a print instruction or a print relay instruction to the CR printer 105 via the terminal 104 will be described next with reference to FIG. 14B. When the user issues a given instruction via the OK button 1901 in the print setting page, the web browser unit 611 sends a print setting result input by the user to the print server 101 to request printing (S2201).

Upon receiving the above-mentioned request from the terminal 104, the web page generation unit 602 of the print server 101 causes the print document management unit 604 of the print server 101 to generate PDL data from the selected document (S2202). The web page generation unit 602 transfers the following information to the print document management unit 604. The transferred information includes herein the document selection result temporarily stored in step S2106, the information of a list of printers to which a print instruction can be issued, which is temporarily stored in step S2108, the printer selection result temporarily stored in step S2113, and the received print setting result. The print document management unit 604 of the print server 101 converts the selected document into PDL data based on these pieces of information in accordance with the model code and print setting of the selected printer, and stores it. The print document management unit 604 transfers the location information that the PDL data is stored to the web page generation unit 602. This location information can be requested by the CR printer 105 as the URL on the Internet 102.

The web page generation unit 602 of the print server 101 determines whether the printer selected by the printer registration unit 622 of the CR printer 105 is a CR printer or an NR printer (S2203). The web page generation unit 602 specifies the ID (the value of the ID data item 801) of the selected printer based on the printer selection result temporarily stored in step S2113, and the information of a list of printers to which a print instruction can be issued, which is temporarily stored in step S2108. The web page generation unit 602 transfers the specified ID to the printer registration unit 622.

The printer registration unit 622 of the CR printer 105 searches the printer relation table 810 to determine whether a record in which the NR printer ID data item 811 coincides with the specified ID is present. The printer registration unit 622 transfers the determination result to the web page generation unit 602. If that record is present, the selected printer is an NR printer; otherwise, the selected printer is a CR printer. In other words, if that record is present, the selected printer is an NR printer associated with a CR printer; otherwise, the selected printer is a CR printer which can directly execute a print instruction. This processing implements a relation determination unit.

If the selected printer is a CR printer (YES in step S2203), the process advances to step S2204. If the selected printer is an NR printer (NO in step S2203), the process advances to step S2207.

The web page generation unit 602 of the print server 101 generates a URL 1600 as data indicating a print instruction to be issued to the CR printer (S2204). The location of the PDL data transferred in step S2202 is stored for the value of parameter "document". The web page generation unit 602 sends back a request for redirection to the URL 1600 generated in step S2204 to the terminal 104 as a response (S2205).

Upon receiving the redirection request from the print server 101, the web browser unit 611 of the terminal 104 requests the CR printer 105 to send a web page at the redirection destination (S2206). Processing in steps subsequent to step S2206 will be described later with reference to FIG. 14C.

If it is determined in step S2203 that the selected printer is an NR printer (NO in step S2203), the web page generation unit 602 of the print server 101 generates a URL 1610 as data indicating a print relay instruction to be issued to the CR printer 105 (S2207). The web page generation unit 602 transfers the printer selection result (in which that NR printer is selected) temporarily stored in step S2113 to the printer management unit 603 of the print server 101. The printer management unit 603 searches the printer relation table 810 to generate a list of CR printers stored in association with that NR printer. The printer management unit 603 acquires the IP addresses of these CR printers from the printer information table. The printer management unit 603 sends back these pieces of information to the web page generation unit 602.

The web page generation unit 602 selects an arbitrary CR printer from the result sent back from the printer management unit 603, and generates the URL 1610 based on the information of this printer.

The web page generation unit 602 sends back a request for redirection to the URL 1610 generated in step S2207 to the terminal 104 as a response (S2208). Upon receiving the above-mentioned redirection request from the print server 101, the web browser unit 611 of the terminal 104 requests the CR printer to send a web page at the redirection destination (S2209). Processing in steps subsequent to step S2209 will be described later with reference to FIG. 14D.

Print processing (pull-printing) by the CR printer 105 will be described with reference to FIG. 14C. This processing corresponds to steps subsequent to step S2206 shown in FIG. 14B. Upon receiving the request issued from the terminal 104 in step S2206, the web page generation unit 621 of the CR printer 105 transfers the value of parameter "document" to the print document acquisition unit 624. The print document acquisition unit 624 downloads a PDL document indicated by the value of "document" from the print server 101 via the communication interface 404 (S2301). The print unit 625 of the CR printer 105 outputs the PDL document downloaded by the print document acquisition unit 624 in step S2301 to the printer engine 405, and prints it (S2302).

On the other hand, the following processing is performed parallel to the processing in steps S2301 and S2302. The web page generation unit 621 of the CR printer 105 inquires the print unit 625 to determine whether printing of the PDL document is in progress (S2303). If printing is in progress (YES in step S2303), the process advances to step S2304. If printing is not in progress (printing is complete) (NO in step S2303), the process advances to step S2307.

The web page generation unit 621 of the CR printer 105 sends back a generated printing-in-progress page 2000 to the terminal 104 as a response (S2304). The web browser unit 611 of the terminal 104 displays the printing-in-progress page 2000 sent back from the CR printer 105 in step S2304 (S2305). In the printing-in-progress page 2000, processing of requesting the CR printer 105 to perform display updating after a predetermined time elapses is defined as web page data. After the predetermined time elapses, the web browser unit 611 of the terminal 104 requests the CR printer 105 to perform display updating (S2306). The process then returns to step S2303.

If printing is not in progress (NO in step S2303), the web page generation unit 621 of the CR printer 105 sends back a printing completion page 2010 to the terminal 104 as a response (S2307). The web browser unit 611 of the terminal 104 displays the printing completion page 2010 sent back from the CR printer 105 in step S2307 (S2308). After processing in steps S2302 and S2308 is completed, the processing sequence ends.

Processing in which the CR printer 105 relays a print instruction, and the NR printer 107 executes printing will be described lastly with reference to FIG. 14D. This processing corresponds to steps subsequent to step S2209 shown in FIG. 14B. Upon receiving the request issued in step S2209, the web page generation unit 621 of the CR printer 105 transfers the value of parameter "document" and that of parameter "target" to the print document acquisition unit 624 of the CR printer 105. The print document acquisition unit 624 downloads a PDL document indicated by the value of "document" from the print server 101 via the communication interface 404 (S2401).

The print document acquisition unit 624 transfers the downloaded PDL data and the IP address of the NR printer 107 indicated by "target" to the print relay unit 626 of the CR printer 105. The print relay unit 626 sends the PDL data to the NR printer 107 indicated by the IP address via the communication interface 404 (S2402). The print unit 632 of the NR printer 107 receives, via the communication interface 504, the PDL data sent from the CR printer 105. The print unit 632 prints the received PDL data (S2403). After the print unit 632 completes printing, it notifies the CR printer 105 of printing completion (S2404).

On the other hand, the following processing is performed parallel to the processing in steps S2401 to S2404. The web page generation unit 621 of the CR printer 105 determines whether the NR printer 107 has notified the CR printer 105 of printing completion (S2405). If printing is not complete but is in progress (YES in step S2405), the process advances to step S2406. If printing is complete (NO in step S2405), the process advances to step S2409. The web page generation unit 621 of the CR printer 105 sends back a printing-in-progress page 2000 to the terminal 104 as a response (S2406). The web browser unit 611 of the terminal 104 displays the printing-in-progress page 2000 sent back from the CR printer 105 in step S2406 (S2407). As described earlier, in the printing-in-progress page 2000, processing of requesting the CR printer 105 to perform display updating after a predetermined time elapses is defined as web page data. After the predetermined time elapses, the web browser unit 611 of the terminal 104 requests the CR printer 105 to perform display updating (S2408). The process then returns to step S2405.

If printing is not in progress (NO in step S2405), the web page generation unit 621 of the CR printer 105 sends back a printing completion page 2010 to the terminal 104 as a response (S2409). The web browser unit 611 of the terminal 104 displays the printing completion page 2010 sent back from the CR printer 105 in step S2409 (S2410). After processing in steps S2404 and S2410 is completed, the processing sequence ends.

Figure 14B:
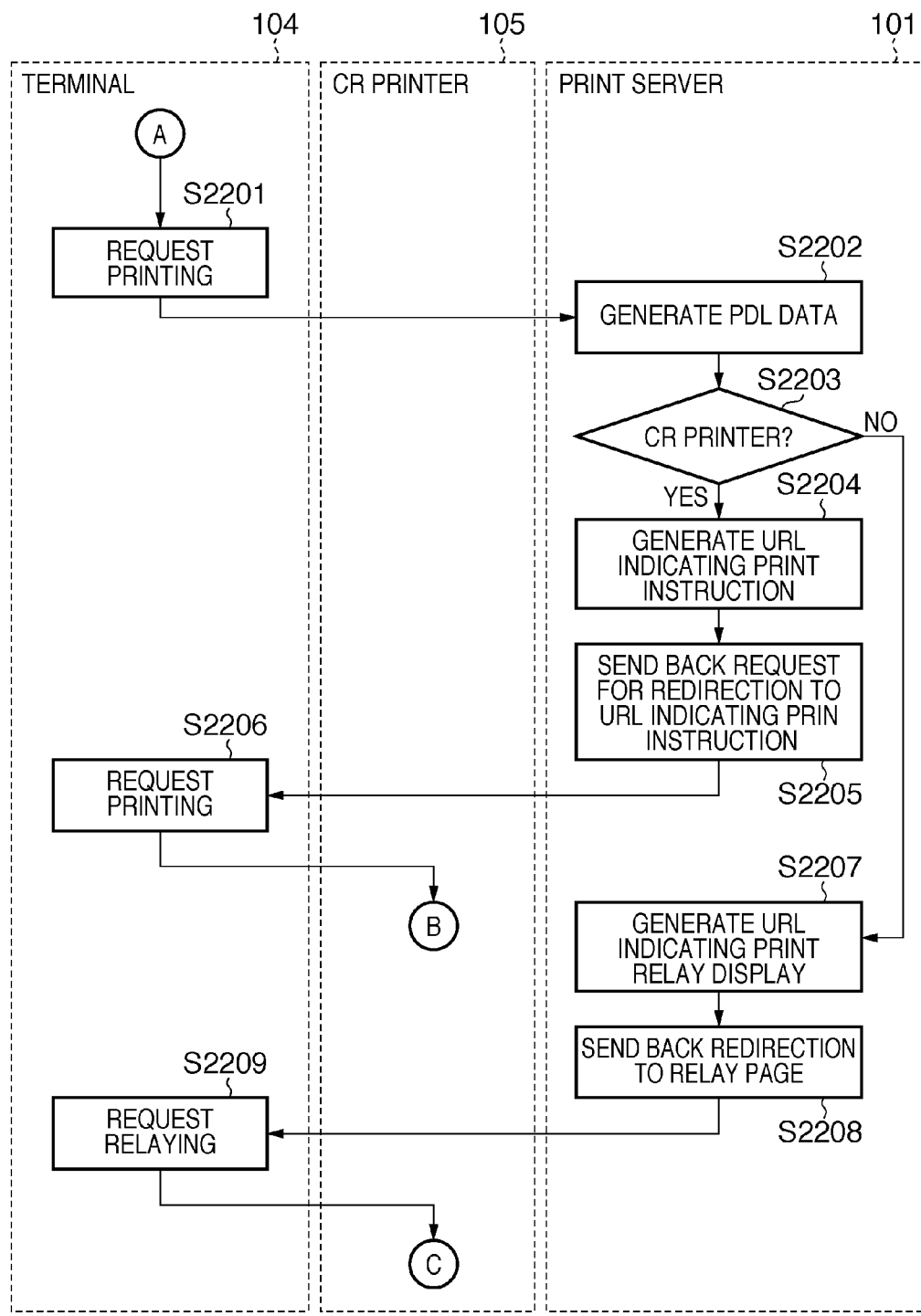
Figure 14C:
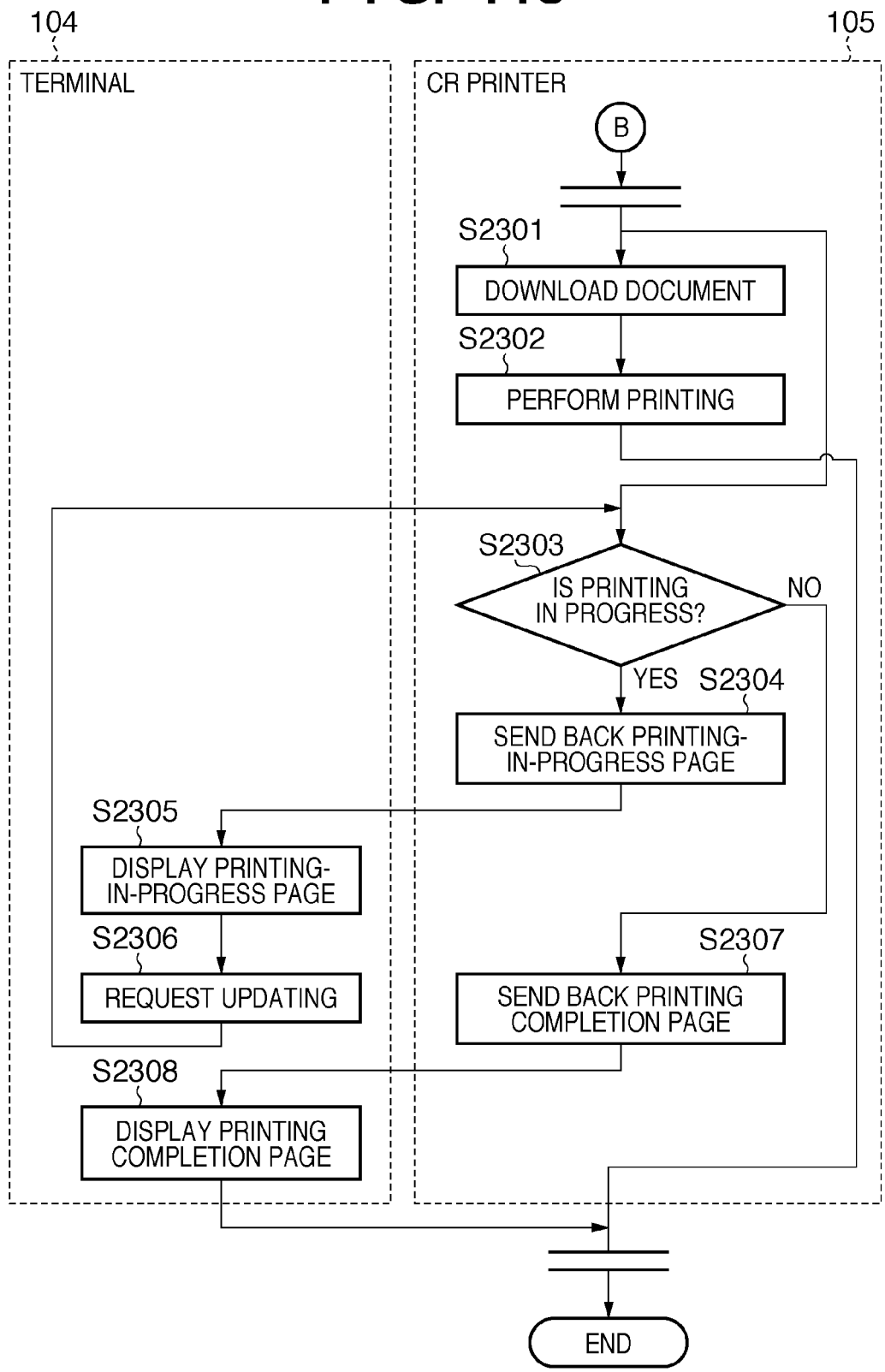

In generating the URL 1610 in step S2207 of FIG. 14B, a plurality of candidates for a CR printer which relays print processing to the NR printer may be selectable. In this embodiment, two CR printers: the CR printers 105 and 106 are present as candidates for that CR printer. Of these CR printers, an arbitrary one is selected as a CR printer which relays a print instruction. In this embodiment, the CR printer 105 is selected. However, URLs 1610 equal in number to CR printers capable of relaying may be generated and included in the response sent to the terminal 104 in step S2208. In this case, the state of a CR printer at the redirection destination is confirmed using a program described in script language such as JavaScript® before redirection. If it is determined as a result of state confirmation that, that CR printer is down because of, for example, power-off, a print instruction is redirected to another CR printer (to another URL 1610). Thus, even if a CR printer which relays a print instruction is unavailable because, for example, it is down, the user can try to relay the print instruction using another CR printer.

In this manner, according to this embodiment, processing is done in accordance with the following sequence. A printer which can communicate with a print server built on the Internet as SaaS searches a local network for other printers. Pieces of information of a plurality of found printers are acquired, and it is checked whether these printers are capable of pull-printing. These printers send the check results and their pieces of information to the print server. The print server registers the plurality of printers at once based on the pieces of received information. The print server stores printers incapable of pull-printing and those capable of pull-printing in association with each other.

In the above-mentioned way, the user can easily register, on the server on the Internet, pieces of information of printers within an intranet. Also, the user can select not only a printer capable of pull-printing but also a printer incapable of pull-printing to print a document. That is, a printer capable of pull-printing downloads a document on the Internet, and sends (relays) it to a printer incapable of pull-printing.

Although a printer having a pull-print function is used to download a document to be printed on behalf of a printer which does not have a pull-print function in this embodiment, the present invention is not limited to this. An apparatus such as a PC capable of both processing of downloading a document and that of generating a print instruction from the document, and issuing a print instruction to a printer which does not have a pull-print function, may be used.

Also, although the print server uses a single machine, it may have a configuration which performs load distribution by clustering a plurality of machines.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-191392, filed Aug. 27, 2010, which is hereby incorporated by reference herein in its entirety.

What is claimed is:

1. A print system in which a print server, a relay apparatus, and a plurality of print apparatuses are connected to a network, and performs print processing, wherein the relay apparatus comprises:
a search unit configured to search for a print apparatus with which the relay apparatus can communicate;
a sending unit configured to send, to the print server, pieces of information of the relay apparatus and the print apparatus found by said search unit; and
a relay unit configured to receive a print instruction that is issued by the print server and that includes location information of document data to be printed and information of a print apparatus used to perform print processing, to download the document data based on the location information included in the print instruction, and to send both the print instruction and the downloaded document data to the print apparatus designated by the print instruction, and the print server comprises:
an apparatus storage unit configured to store the information of the print apparatus sent by said sending unit of the relay apparatus;
a relation storage unit configured to store association between the relay apparatus and the print apparatus, based on the pieces of information of the relay apparatus and the print apparatus, that are sent by said sending unit of the relay apparatus;
a receiving unit configured to receive a print instruction issued to the print apparatus stored in said apparatus storage unit; and
an instruction unit configured to issue a print instruction including the location information of the document data to be printed and the information of the print apparatus, based on the pieces of information stored in said relation storage unit and said apparatus storage unit, in response to the print instruction received by said receiving unit, wherein
a communication-capable print apparatus which is used as the print apparatus and can communicate with the print server, and
a communication-incapable print apparatus which is used as the print apparatus and cannot communicate with the print server, are connected to a network,
the communication-capable print apparatus and the communication-incapable print apparatus configured to communicate with each other, and wherein
the communication-capable print apparatus comprises a print unit configured to receive the print instruction that is issued by the print server and includes the location information of the document data to be printed, to download the document data based on the location information, and to print the document data, and wherein
the relay apparatus further comprises a determination unit configured to determine whether the print apparatus found by said search unit is the communication-capable print apparatus or the communication-incapable print apparatus,
said sending unit further sends information of a determination result obtained by said determination unit to the print server,
said relation storage unit of the print server further stores association between the communication-incapable print apparatus and the relay apparatus, based on the determination result obtained by said determination unit of the relay apparatus, that is sent by said sending unit of the relay apparatus, and wherein
said instruction unit of the print server comprises:
a relation determination unit configured to determine whether the print apparatus to which the print instruction received by said receiving unit is to be issued is the communication-incapable print apparatus having the association with the relay apparatus, that is stored in said relation storage unit;
a print instruction unit configured to send the print instruction including the location information of the document data to be printed to the communication-capable print apparatus if said relation determination unit determines that a print apparatus has no association stored in said relation storage unit; and
a relay instruction unit configured to send the print instruction, including the location information of the document data to be printed and the information of the communication-incapable print apparatus to which the print instruction received by said receiving unit is to be issued, to the relay apparatus stored in association with the communication-incapable print apparatus if said relation determination unit determines that the print apparatus has the association stored in said relation storage unit.

2. The system according to claim 1, wherein the communication-capable print apparatus includes the relay apparatus.

3. The system according to claim 1, wherein when said relay instruction unit has failed to send the print instruction to one communication-capable print apparatus, said relay instruction unit sends the print instruction to another communication-capable print apparatus stored in association with the print apparatus serving as a sending destination of the print instruction received by said receiving unit.

4. The system according to claim 1, wherein the print server is located on the Internet, and the relay apparatus and the plurality of print apparatuses are located on a local network, and said apparatus storage unit of the print server stores the information of the print apparatus, that is sent by said sending unit, together with an identifier used to identify the local network to which the relay apparatus belongs.

5. A relay apparatus in a print system in which a print server, the relay apparatus, and a plurality of print apparatuses are connected to a network, and which performs print processing, comprising:
  a search unit configured to search for a print apparatus with which the relay apparatus can communicate;
  a sending unit configured to send, to the print server, pieces of information of the relay apparatus and the print apparatus found by said search unit; and
  a relay unit configured to receive a print instruction that is issued by the print server and includes location information of document data to be printed and information of a print apparatus used to perform print processing, to download the document data based on the location information included in the print instruction, and to send both the print instruction and the downloaded document data to the print apparatus designated by the print instruction, wherein in the print system
  a communication-capable print apparatus which is used as the print apparatus and can communicate with the print server, and
  a communication-incapable print apparatus which is used as the print apparatus and cannot communicate with the print server, are connected to a network,
  the communication-capable print apparatus and the communication-incapable print apparatus configured to communicate with each other, and wherein
  the communication-capable print apparatus comprises a print unit configured to receive the print instruction that is issued by the print server and includes the location information of the document data to be printed, to download the document data based on the location information, and to print the document data, and wherein
  the relay apparatus further comprises a determination unit configured to determine whether the print apparatus found by said search unit is the communication-capable print apparatus or the communication-incapable print apparatus, and
  said sending unit further sends information of a determination result obtained by said determination unit to the print server, wherein
  the print server stores association between the communication-incapable print apparatus and the relay apparatus, based on the determination result obtained by said determination unit, that is sent by said sending unit,
  the print server determines whether the print apparatus to which the print instruction received by the print server is to be issued is the communication-incapable print apparatus having the association with the relay apparatus, that is stored in said print server,
  the print server sends the print instruction to the communication-capable print apparatus if it is determined that the print apparatus has no association stored in said print server, and
  the print server sends the print instruction to the relay apparatus stored in association with the communication-incapable print apparatus if it is determined that the print apparatus has the association stored in said print server.

6. A print server in a print system in which the print server, a relay apparatus, and a plurality of print apparatuses are connected to a network, and which performs print processing, comprising:
  an apparatus storage unit configured to store information of the print apparatus sent by a sending unit of the relay apparatus;
  a relation storage unit configured to store association between the relay apparatus and the print apparatus, based on pieces of information of the relay apparatus and the information of the print apparatus, that are sent by the sending unit of the relay apparatus;
  a receiving unit configured to receive a print instruction issued to the print apparatus stored in said apparatus storage unit; and
  an instruction unit configured to issue a print instruction including location information of document data to be printed and the information of the print apparatus, based on the pieces of information stored in said relation storage unit and said apparatus storage unit, in response to the print instruction received by said receiving unit, wherein in the print system
  a communication-capable print apparatus which is used as the print apparatus and can communicate with the print server, and
  a communication-incapable print apparatus which is used as the print apparatus and cannot communicate with the print server, are connected to a network,
  the communication-capable print apparatus and the communication-incapable print apparatus configured to communicate with each other, and wherein
  the communication-capable print apparatus comprises a print unit configured to receive the print instruction that is issued by the print server, to download the document data based on the location information, and to print the document data, and wherein
  the relay apparatus determines whether the print apparatus found by the relay apparatus is the communication-capable print apparatus or the communication-incapable print apparatus and sends information of a determination result to the print server, and wherein
  said relation storage unit further stores association between the communication-incapable print apparatus and the relay apparatus, based on the determination result obtained by said relay apparatus, and wherein
  said instruction unit comprises:
  a relation determination unit configured to determine whether the print apparatus to which the print instruction received by said receiving unit is to be issued is the communication-incapable print apparatus having the association with the relay apparatus, that is stored in said relation storage unit;
  a print instruction unit configured to send the print instruction to the communication-capable print apparatus if said relation determination unit determines that a print apparatus has no association stored in said relation storage unit; and a relay instruction unit configured to send the print instruction to the relay apparatus stored in association with the communication-incapable print apparatus if said relation determination unit determines that the print apparatus has the association stored in said relation storage unit.

7. A print method in a print system in which a print server, a relay apparatus, and a plurality of print apparatuses are connected to a network, and which performs print processing, comprising:

in the relay apparatus, a search step of searching for a print apparatus with which the relay apparatus can communicate;

a sending step sending, to the print server, pieces of information of the relay apparatus and the print apparatus found in the search step; and a relay step of receiving a print instruction that is issued by the print server and includes location information of document data to be printed and information of a print apparatus used to perform print processing, downloading the document data based on the location information included in the print instruction, and sending both the print instruction and the downloaded document data to the print apparatus designated by the print instruction; and in the print server, an apparatus storage step of storing the information of the print apparatus sent in the sending step of the relay apparatus;

a relation storage step of storing association between the relay apparatus and the print apparatus, based on the pieces of information of the relay apparatus and the print apparatus, that are sent in the sending step of the relay apparatus;

a receiving step of receiving a print instruction issued to the print apparatus stored in the apparatus storage step; and an instruction step of issuing a print instruction including the location information of the document data to be printed and the information of the print apparatus, based on the pieces of information stored in the relation storage step and the apparatus storage step, in response to the print instruction received in the receiving step, wherein a communication-capable print apparatus which is used as the print apparatus and can communicate with the print server, and a communication-incapable print apparatus which is used as the print apparatus and cannot communicate with the print server, are connected to a network, the communication-capable print apparatus and the communication-incapable print apparatus configured to communicate with each other, and wherein the communication-capable print apparatus receives the print instruction that is issued by the print server and includes the location information of the document data to be printed, to download the document data based on the location information, and to print the document data, the relay apparatus further determines in a determination step whether the print apparatus found in said search step is the communication-capable print apparatus or the communication-incapable print apparatus, and in said sending step information is sent of a determination result obtained in said determination step to the print server, and wherein said relation storage step stores association between the communication-incapable print apparatus and the relay apparatus, based on the determination result obtained in said determination step, that is sent in said sending step, and wherein said instruction step further includes:

a relation determination step of determining whether the print apparatus to which the print instruction received in said receiving step is to be issued is the communication-incapable print apparatus having the association with the relay apparatus, that is stored in said relation storage step;

a print instruction step of sending the print instruction including the location information of the document data to be printed to the communication-capable print apparatus if in said relation determination step it is determined that the print apparatus has no association stored in said relation storage step; and a relay instruction step of sending the print instruction, including the location information of the document data to be printed and the information of the communication-incapable print apparatus to which the print instruction received in said receiving step is to be issued, to the relay apparatus stored in association with the communication-incapable print apparatus if in said relation determination step it is determined that the print apparatus has the association stored in said relation storage step.

* * * * *